US005909087A

United States Patent [19]

Bryde et al.

[11] Patent Number: 5,909,087

[45] Date of Patent: Jun. 1, 1999

[54] LIGHTING CONTROL WITH WIRELESS REMOTE CONTROL AND PROGRAMMABILITY

[75] Inventors: Gary W. Bryde, Catasauqua; Donald J. Wolbert, III, Emmaus; Simo Pekka Hakkarainen, Bethlehem; Joel S. Spira, Coopersburg, all of Pa.

[73] Assignee: Lutron Electronics Co. Inc., Coopersburg, Pa.

[21] Appl. No.: 08/614,712

[22] Filed: Mar. 13, 1996

[51] Int. Cl.[6] .................. G02B 13/18

[52] U.S. Cl. .................. 315/149; 359/356

[58] Field of Search .................. 359/355, 356, 359/362, 708, 709–719; 315/149, 158, 321, 291, 295, 315, DIG. 4

[56] References Cited

U.S. PATENT DOCUMENTS

| | | | |
|---|---|---|---|
| 4,240,692 | 12/1980 | Winston | 385/146 |
| 4,575,660 | 3/1986 | Zaharchuk et al. | 315/295 |
| 4,649,323 | 3/1987 | Pearlman et al. | 315/307 |
| 4,655,555 | 4/1987 | Machler et al. | 359/365 |
| 4,727,296 | 2/1988 | Zaharchuk et al. | 315/295 |
| 4,733,138 | 3/1988 | Pearlman et al. | 315/307 |
| 4,797,599 | 1/1989 | Ference et al. | 315/194 |
| 4,924,151 | 5/1990 | D'Aleo et al. | 315/295 |
| 5,099,193 | 3/1992 | Moseley et al. | 323/324 |
| 5,191,265 | 3/1993 | D'Aleo et al. | 315/295 |
| 5,237,264 | 8/1993 | Moseley et al. | 323/324 |
| 5,248,919 | 9/1993 | Hanna et al. | 315/291 |
| 5,399,940 | 3/1995 | Hanna et al. | 315/129 |
| 5,430,356 | 7/1995 | Ference et al. | 315/291 |
| 5,463,286 | 10/1995 | D'Aleo et al. | 315/295 |

FOREIGN PATENT DOCUMENTS 0 471 215 2/1992 European Pat. Off. .

OTHER PUBLICATIONS

Lightolier Controls, Product Instruction Sheet, Model No. OS600–AL, known prior to the filing date of the present invention.

InteliSwitch, digital time switch by The Watt Stopper, known prior to the filing date of the present invention.

Advanced Technology Products, Inc. Dynasty 2000, known prior to the filing date of the present invention.

Westek, Touch–A–Level, known prior to the filing date of the present invention.

Specimen A is an infrared lens manufactured by Lutron Electronics Co., Inc. and sold in the U.S. more than one year prior to the filing of the present patent application.

*Primary Examiner*—Don Wong
*Assistant Examiner*—David H. Vu
*Attorney, Agent, or Firm*—Seidel, Gonda, Lavorgna & Monaco, PC

[57] ABSTRACT

A remotely controllable and programmable power control unit for controlling and programming the state and power level, including special functions, of one or more electrical devices. The electrical device can be an electric lamp. The system includes a user-actuatable remote transmitter unit and a user-actuatable power control unit adapted to receive control signals from the remote transmitter unit. Both the remote transmitter unit and the power control unit include a power selection actuator for selecting a desired power level between a minimum power level and a maximum power level, and control switches for generating control signals representative of programmed power levels of one or more power scenes and special functions. In response to an input from a user, either directly or remotely, the one or more devices of the one or more power scenes can be controlled between an on or off state, to a desired programmed preset, or to a maximum power level.

2 Claims, 22 Drawing Sheets

FIG. 2
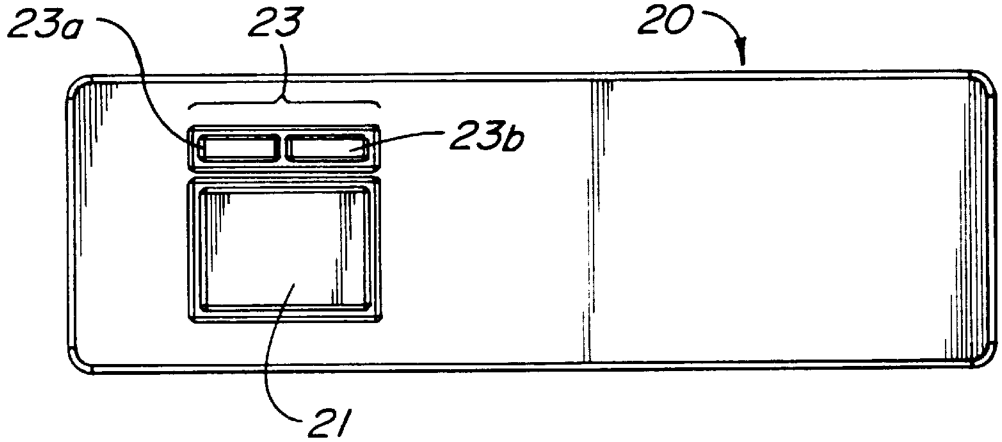
FIG. 2A
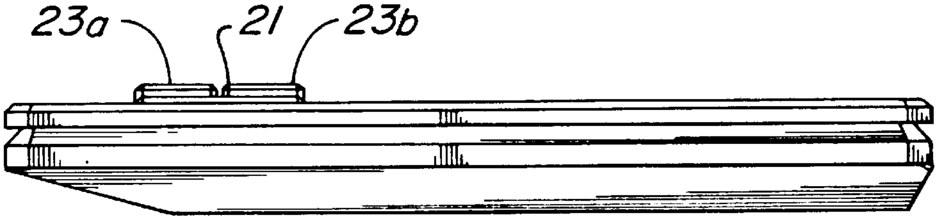
FIG. 2B
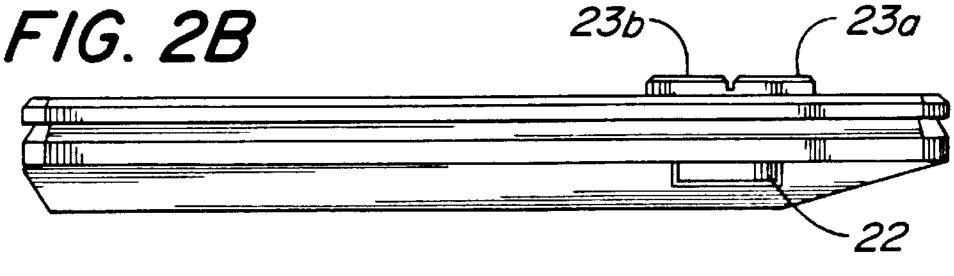
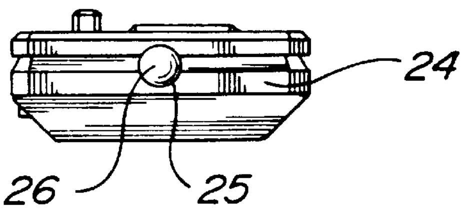
FIG. 2C

LIGHTING CONTROL WITH WIRELESS REMOTE CONTROL AND PROGRAMMABILITY

FIELD OF THE INVENTION

The present invention relates to a wireless controllable and programmable power control system for controlling and programming the state and power intensity level of one or more electrical devices in one or more zones for the creation of one or more lighting scenes.

BACKGROUND OF THE INVENTION

Lighting control systems comprising switches and dimmers have become increasingly popular, especially for applications where it is desired to precisely control the level of light intensity in a particular room. In the simplest type of dimmer controlled lighting systems, a dimmer switch actuator is manipulated by hand, to control the setting of a variable resistor which in turn controls the switching of a solid state power control device such as a triac. The switching of the solid state power control device, in turn, varies the voltage input to the lamp to be dimmed. This type of system, incorporating a dimmer switch, is simple and easy to construct, but offers limited additional features and flexibility. One feature this system lacks is the ability to return to a prior or preset light intensity level after having been adjusted to a subsequent intensity level. Typically, a dimmer switch based system has no ability to memorize or recall prior intensity settings. Consequently, preset light intensity levels can be reestablished only by trial and error in manipulating the variable resistor of the dimmer.

Other lighting control systems comprise touch actuator operated lighting controls which address some of the limitations associated with the manually-operated variable resistor controlled dimmer switch previously described. In one example of a touch actuator operated control system, the lamp is cycled repetitively through a range of intensities, from dim to bright, in response to extended touch inputs. When the desired intensity is reached, the touch input is removed, the cycle will stop, and the level of light intensity is set (preselected) and stored in a memory function that is typically provided by such systems. Typically, a subsequent short touch input will turn the lamp off, and a further short touch input will turn the lamp on at the set intensity level stored in the memory. While this type of device is an improvement over manuallyoperated dimmer switches, it requires the user to go through the cycle of intensity levels in order to arrive at a different intensity level. In addition, this type of device lacks the ability to return to a set or preset intensity level when the level is changed. A user must go through the cycle again until he or she finds the light intensity level desired. Moreover, this type of device has no ability to perform certain aesthetic effects such as a gradual fade from one light intensity level to another.

U.S. Pat. No. 4,649,323 discloses a microcomputer-controlled light control which provides a fade function. The control disclosed in that patent is operated by a pair of non-latching switches which provide inputs to a microcomputer. The microcomputer is programmed to determine whether the switches are tapped or held (i.e., whether they are touched for a transitory duration or for a longer period of time). When a switch is held, the light intensity is either decreased or increased, and release of the switch causes the intensity setting to be entered into a memory. If the control is operating at a static light intensity level, a tap of a switch will cause the light intensity level to fade to a preset level, either off, full on, or an intermediate level. A tap while the light intensity level is fading will cause the fade to be terminated and cause the light intensity level to shift immediately and abruptly to either full on or full off, depending on which switch is tapped. This type of control, however, is not without drawbacks of its own. For example, a single tap by a user is interpreted in either of two very different ways (initiate fade or terminate fade), depending on the state of the control at the time the user applies the tap to a switch. This can be confusing to a user, who may erroneously terminate a fade when it is desired to initiate a fade, and vice versa. In addition, it is not possible to reverse a fade by a subsequent tap of the same switch while a fade is in progress. Instead, a tap while the control is fading in one direction will not reverse the direction of the fade but will cause the control to “jump” to either full on or full off. An abrupt shift from a low intensity level to full on, or from a high intensity to no light at all (full off), can be quite startling to the user and others in the area (and even dangerous, if the user and others are suddenly plunged into darkness).

The control disclosed in U.S. Pat. No. 4,649,323 also lacks a long-duration fade to off, as do the other prior control designs. In many cases, it is desirable for a user to be able to have the lights fade out gradually. For example, a user may wish to turn out bedroom lights before retiring, but still have sufficient light to safely make his or her way from the control location to the bed before the lights are completely extinguished. There may also be situations where the night staff of a large building may need to extinguish ambient lights from a central location which is located some distance away from an exit, and may need a level of illumination in order to walk safely to the exit. These features would not be possible with the prior control, which would offer the user either almost immediate darkness or a constant level of intensity throughout the night, neither of which would be acceptable.

Commonly assigned U.S. Pat. Nos. 4,575,660, 4,924,151, 5,191,265, 5,248,919, 5,430,356, and 5,463,286, disclose various lighting control systems in which lamps or groups of lamps, in one or more zones, are varied in brightness to produce several different scenes of illumination. The level of brightness of the lamps constituting each lighting group is displayed to the user by either the number of light emitting diodes, LED’s illuminated in a linear array of the LED’s, or the position of a potentiometer slider in a linear track.

U.S. Pat. Nos. 5,191,265, and 5,463,286 disclose wall mounted programmable modular control systems for controlling groups of lights in one or more zones. In these systems, the lights are controlled by a master control wall module, a remote wall unit, and by a remote hand held control unit. The hand held unit communicates to the master control module by conventional infra-red (IR) transmission techniques.

The lighting control device in U.S. Pat. No. 5,248,919 has all of the light control features needed to effectively and safely control the state and intensity level of one or more lights. However, this device lacks many desirable features such as wireless remote controllability, programmability, the ability to lock and unlock a preset function and a delayed off. In many cases, it is desirable for a user to be able to have one or more lamps fade to a pre-selected intensity level or state, or to fade to off after a variable delay time. It would be even more useful and desirable to be able to remotely control and program the preset light intensities of one or more lamps associated with one or more lighting scenes.

Another lighting device known in the art as “Onset Dimmer OS600” is manufactured by Lightolier Controls, Inc. Unlike the present invention, which allows a user to selectively lock and unlock a stored preset light intensity level with an actuator, which also performs other functions, the prior art Lightolier device cannot unlock the preset light intensity when stored. In other words, the Lightolier device can only lock a different preset light intensity into its memory. Further, unlike the present invention, the Lightolier device uses a separate dedicated switch with a separate dedicated actuator in order to lock in a preset light intensity level.

There is thus a need for an improved lighting control system which offers advantages not possible with prior controls while avoiding the drawbacks of the prior controls. The present invention fills that need.

SUMMARY OF THE INVENTION

The present invention is directed to a wireless remotely controllable and programmable power control unit and receiver system having at least one power control unit for controlling and programming the state and power level of one or more electrical devices. When the electrical device is a light source, one or more power control units control the intensity of the one or more light sources in one or more zones for the creation of one or more lighting scenes. The system includes a user-actuatable wireless remote hand held transmitter unit, and at least one power control and receiver unit adapted to receive control signals from the remote transmitter unit. The receiver of the power control unit includes a wide angle infra-red (IR) lens which has a wide field of view in a horizontal plane but a limited field of view in a vertical plane.

One embodiment of the present invention includes a basic user-actuatable wireless remote control unit. The basic wireless remote control unit has a raise/lower type intensity control and a single on/off control. The basic wireless remote control unit sends control signals to one or more receiver units which in turn control one or more light sources in one or more zones. Each receiver unit defines a zone controlling one or more light sources. The basic wireless remote control unit can control one or more receiver units, as a group. This means that the basic remote unit commands all the receiver units to control the lamps connected to then simultaneously. A unique feature of the basic wireless remote control unit is that the controls mimic controls of the receiver unit. Hence, operating a control on the basic wireless remote control has the same effect as operating the corresponding control on the receiver unit.

Another embodiment of the present invention includes an enhanced wireless remote control unit having one or more scene selection switches. In addition to having the features of the basic wireless remote control unit, the enhanced remote unit can send scene control signals to one or more receiver units to control them as a group. In addition, the enhanced wireless remote control unit can program the lighting levels associated with each lighting scene so that a desired preset light level can be established and stored in memory in the receiver unit.

Yet another embodiment of the present invention includes a second basic or a second enhanced wireless remote control unit having all the features of the previous embodiments in addition to an address selection switch. The address selection switch is used to address and send control signals to one or more receiver units assigned the selected address either individually or as a group. In addition to controlling the receiver units, once they have been assigned address the second enhanced remote unit can be used to assign addresses to individual receiver units.

In all embodiments of the present invention, the program mode is built into the receiver unit so that it can be programmed remotely by the enhanced wireless remote control units. In the program mode, the user can select and store one or more desired preset light intensity levels for the lights controlled by the receiver unit.

In all embodiments of the invention, a preset light intensity level can be stored into the receiver unit by three actuations of the on/off switch (locking a preset). When the preset level is stored and locked, the receiver unit will always return to the locked preset level when given an on command, either directly or remotely. The stored preset level can also be cleared by four actuations of the on/off switch (unlocking a preset). If the stored preset level is not locked before an off command, the receiver unit will return to the intensity level to which it was set just prior to the last off command, when the receiver unit is again turned on.

In the preferred embodiment of the present invention, the basic and enhanced wireless remote control units employ conventional infra-red (IR) signal encoding as a means to transmit control signals to the receiver unit. The encoded control signals are for commanding such things as a scene select, increase light intensity, decrease light intensity, light on, light off, lights to full, light off after a delay, enter program mode, set preset level, and set address.

However it is understood that other encoded signals can be employed. In addition, other transmitting and receiving means such as radio frequency (RF) and lightwave signals can be employed.

In the preferred embodiment of the present invention, the wireless remote control units and the receiver units have at least one scene control or an on/off control, and at least one raise/lower intensity control. The intensity control enables the user to select a desired intensity level between a minimum intensity level and a maximum intensity level. The scene control enables a user to select a preset light intensity level for one or more light sources in one or more zones that define a lighting scene. The on/off control enables a user to fade the light intensity either on or off.

In addition, the on/off control enables a user to activate additional features. These additional features include, but are not limited to, a variable delay to off, and a fade to full and are described in detail below.

An FADE TO OFF response is effected by a single actuation, for example a temporary application of pressure sufficient to open or close a switch once, causing all lights associated with at least one receiver unit to fade, at a first fade rate, from any intensity level to an off state.

A FADE TO PRESET response is effected by a single actuation, causing a light to fade, at a first fade rate, from an off state or any intensity level to a preprogrammed preset intensity level.

A DELAY TO OFF response is effected by a press and hold actuation, i.e., a more than a temporary application of pressure sufficient to open or close a switch, causing a light to fade, at a first fade rate, from any intensity level to an off state after a variable delay. The variable delay is a function of user input and is equal to: (hold time −0.5)×20 seconds.

A FADE TO FULL is effected by a double actuation, two temporary applications of pressure sufficient to open or close a switch applied in rapid succession, causing a light to fade, at a second fade rate, from an off state or any intensity level to a maximum intensity level.

In one embodiment of the invention, the intensity selection actuator comprises a rocker switch actuatable between first, second, and third positions. The first position corresponds to an increase in intensity level, and the second position corresponds to a decrease in intensity level. The third is a neutral position.

In an alternate embodiment, the intensity selection actuator comprises first and second switches, each actuatable between a first and second position. Actuation of the first switch causes an increase in the desired intensity level and actuation of the second switch causes a decrease in the desired intensity level at specific fade rates.

In a preferred embodiment of the receiver unit, a plurality of illuminated intensity indicators are arranged in a sequence representing a range from a minimum to a maximum intensity level. The position of each indicator within the sequence is representative of an intensity level relative to the minimum and maximum intensity levels of the controlled light sources. The sequence may, but need not, be linear. The invention also comprises a first indicator, having a first illumination level, for visually indicating the preset intensity level of a controlled light when the light is on. The preferred embodiment may further comprise a second indicator, having a second illumination level, for visually indicating a preset intensity level of a controlled light when the light is off. The second illumination level is less than the first illumination level when said light is on. The second illumination level is preferably sufficient to enable said indicators to be readily perceived by eye in a darkened environment.

In yet another embodiment of the present invention, the control system preferably includes a microcontroller having changeable software. The microcontroller may include means for storing in a memory digital data representative of the delay times. The microcontroller may also include means for storing in a memory digital data representative of a preset intensity level. Further, the control system may comprise a means for changing or varying the fade rates or delay to off stored in memory. The microcontroller may also include means for distinguishing between a temporary and more than a temporary duration of actuation of a control switch, for the purpose of initiating the fade of a light according to an appropriate fade rate.

In one embodiment of the invention, all fade rates are equal. In an alternate embodiment, each fade rate is different. In still another embodiment, the second fade rate is substantially faster than the first fade rate.

In an alternate embodiment of the present invention, the power control unit includes an infrared lens for receiving infrared light signals containing information transmitted from a wireless infrared transmitter.

In one aspect of the invention, the lens comprises a planar infrared receiving surface, an infrared output surface, and a flat infrared transmissive body portion therebetween. The output surface of the lens has a shape substantially conforming to an input surface of an infrared detector. The flat body portion of the lens has external side surfaces substantially conforming to an ellipse. The side surfaces are positioned on either side of a longitudinal axis that is defined by the lens. The elliptical side surfaces are shaped to reflect the infrared light that enters the lens input surface. The light reflects off the side surfaces and passes through the body portion to the output surface. The output surface directs the infrared light onto the input surface of the infrared detector. The infrared detector is positioned substantially behind the lens output surface.

In another aspect of the invention, the infrared lens is located on movable number so that the lens output surface is adjacent to an input surface of an infrared detector. The infrared detector is located in a fixed position behind the lens. The movable number and the lens move in a direction that is toward or away from the fixed position of the infrared detector and its input surface.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 2 shows a top view of a preferred embodiment of a hand held basic remote control unit in accordance with the present invention.

FIG. 2A shows a left side view of the basic remote control unit as shown in FIG. 2.

FIG. 2B shows a right side view of the basic remote control unit as shown in FIG. 2.

FIG. 2C shows an end view of the basic remote control unit shown in FIG.2.

DETAILED DESCRIPTION

Figure 1:
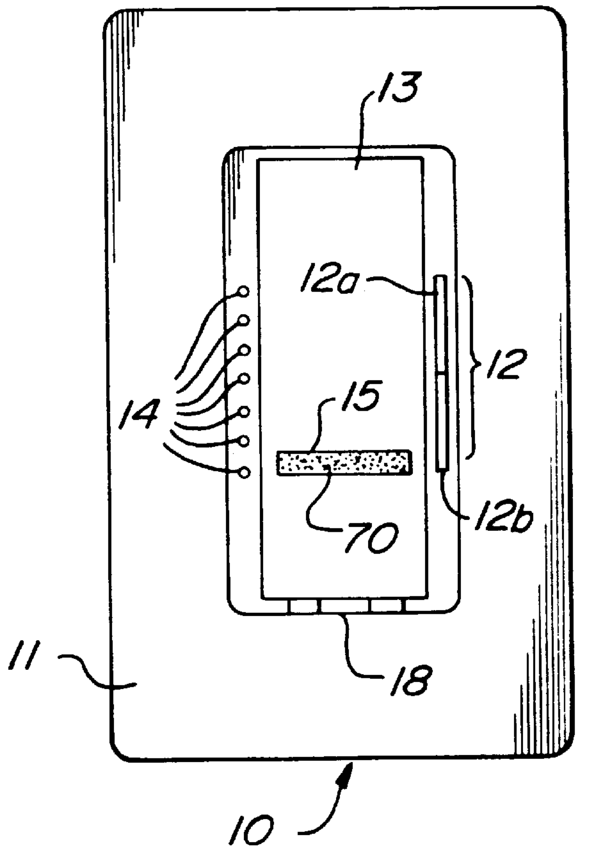
FIG. 1 shows a front view of a preferred embodiment of a power control and receiver unit with an infra-red lens in accordance with the present invention.

Referring now to the drawings, wherein like numerals indicate like elements, there is shown in FIG. 1 a power control and infra-red receiving control unit 10 embodying a power control device according to the present invention for controlling electric power delivered to at least one electrical device (not shown). The control unit 10 comprises a cover plate 11 and a plurality of control actuators comprising a user actuatable power level selection actuator 12, a user actuatable control switch actuator 13, hereinafter referred to as a toggle switch actuator 13, and an air gap switch actuator 18 which controls an air gap switch (not shown) for removing all electric power to the control unit 10. The control unit 10 further comprises a power level indicator in the form of a plurality of individual LEDs 14 arranged in a line.

The control unit 10 further comprises an infra-red (IR) receiving lens 70 located in an opening 15 on the toggle switch actuator 13. The lens 70 captures IR control signals that are transmitted by any one of a number of wireless transmitter units 20, 30, 40, 50, described below. The structure of infra-red receiving lens 70 will be described in more detail below.

In one aspect of the invention, power control signals are transmitted to the control unit 10 by a wireless hand held user actuatable basic remote control 20 or a wireless hand held user actuatable enhanced remote control 30, 40, 50, depicted in FIGS. 2, 3, 4, and 5, respectively.

Figure 10:
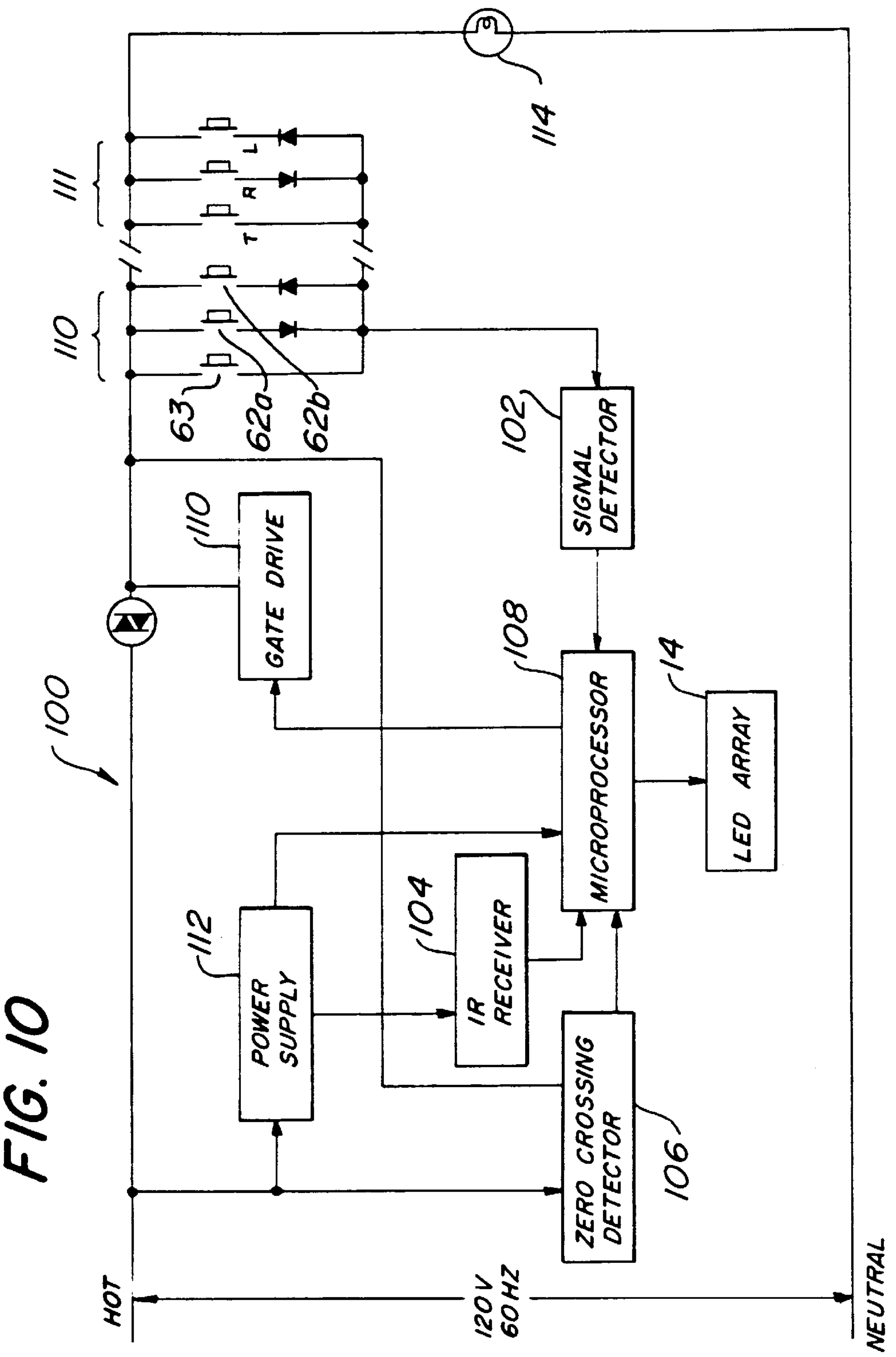
FIG. 10 shows a block diagram of the circuitry of the receiver unit shown in FIG. 1.

In another aspect of the invention, the control unit 10 embodies a power control and infra-red receiver circuit 100 shown in FIG. 10, for controlling one or more electrical devices. The control unit 10 is designed to control the electric power delivered to at least one electrical device.

Preferably, the electrical device controlled by control unit 10 is an electric lamp or lamps 114, as shown in FIG. 10. The control unit 10 controls the electric power delivered to, and hence the light intensity of, the electric lamp or lamps 114 in known manner by using a phase controlled triac circuit or otherwise.

However, it is to be understood that the electrical device could be a fan, a motor, a relay, etc. In addition, the type of lamp 114 controlled is not limited to an incandescent lamp but could be a low voltage incandescent lamp, a fluorescent lamp, or other type of lamp.

The preferred embodiments described below are described in the context of the electrical device being a lamp or lamps 114 and the control unit 10 controlling the intensity of these lamps.

When the electrical device includes at least one lamp, the at least one lamp defines a lighting zone (hereinafter zone.) By incorporating multiple control units 10, multiple zones can be created and controlled. The zones are used to create lighting scenes (hereinafter scenes) by controlling the power level, and therefore the intensity, of the lamps associated with one or more zones, thereby creating a plurality of scenes. Therefore, multiple scenes can be created with one or more power control units 10, which can be controlled by the control unit or the remote transmitters 20, 30, 40, 50.

Hereinafter, the terms "actuation" or "actuated" mean either opening, closing, or maintaining closed for a particular period of time, a switch having one or more poles. In the preferred embodiment of the invention the switches are momentary contact switches and actuation is caused by the application of pressure to the switch actuator of sufficient force to either open or close a switch. However, other types of switches could be used.

POWER CONTROL AND RECEIVER UNIT

Referring to FIG. 1, the power level selection actuator 12 is actuated by the user to set a desired level of light intensity of the one or more electric lamps controlled by the control unit 10. The selection actuator 12 further comprises an upper power level selector portion 12*a* and a lower power level selector portion 12*b*, controlling respective power level selector switches 62*a*, 62*b* shown in FIG. 10.

The upper power level selector portion 12*a*, when actuated, causes an increase or "RAISE" in intensity of the lamps controlled by the control unit 10. Conversely, the lower power level selector portion 12*b*, when actuated with control unit 10 in the on state, causes a decrease or "LOWER" in intensity of the lamps controlled by the control unit 10. In addition, if the lower power level selector portion 12*b* is actuated when control unit 10 is in the off state, it can be used to set and store a delay to off time. The longer the lower power level selector 12*b* is actuated, the longer the delay time to be set and stored.

The actuation of user actuatable control switch actuator 13 causes control unit 10 to respond in a variety of ways, depending on the precise nature of the actuation of control switch actuator 13 which actuates control switch 63, i.e., whether it is actuated for a transitory period of time or a longer than transitory period of time, or whether it is actuated for several transitory periods of time in quick succession, and also depending on the state of the control unit 10 prior to the actuation of the control switch actuator 13.

In the present, an actuation has a transitory duration if the duration of the actuation is less than 0.5 seconds. Two successive actuations of the actuator, in rapid succession (double tap), refers to two transitory actuations that are within 0.5 seconds of each other. Three successive actuations of an actuator, in rapid succession (triple tap), refers to three transitory actuations all within 1.0 second. Four successive actuations of an actuator, in rapid succession (quad tap), refers to four transitory actuations all within 1.5 seconds.

Although these time periods are presently preferred for determining whether a double tap, triple tap, or quad tap actuations has occurred, any short period of time may be employed without departing from the invention. For example, a time period of 1.5 seconds could be used for determining whether a double tap, triple tap, or a quad tap has occurred so that in an alternative embodiment of the invention, if two successive actuations of transitory duration occurred in 1.5 seconds it would be considered a double tap. The period of time during which multiple successive actuations of transitory duration are looked for is considered to be a short duration of time.

It is also possible to have an actuation of an actuator for more than 0.5 seconds, which is considered to be extended in nature and has an extended duration.

The responses to the actuation of the control switch actuator 13 are to increase the light intensity from zero to a preset level (FADE TO PRESET), increase the light intensity to maximum (FADE TO FULL), decrease the light intensity to zero (FADE TO OFF), decrease the light intensity to zero after a delay (DELAY TO OFF), store a preset light level in memory (LOCKED PRESET), and remove a preset light level from memory (DISCONTINUE LOCKED PRESET). These features are executed by means of circuitry associated with the control unit 10 and depicted in a block diagram 100, shown in FIG. 10, described in detail in the flow charts illustrated in FIGS. 13–20.

A FADE TO PRESET response is effected by a single actuation of transitory duration of the user actuatable control switch actuator 13 when the control unit 10 is in the off state, thereby causing the intensity of the electric lamp 114 to increase at a first fade rate, from zero to a preset intensity level. This can be either a locked preset level or the level at which the lamp was illuminated when the control unit 10 was last in an on state, as will be described in more detail below.

A FADE TO FULL response is effected by a double actuation, i.e., two actuations of transitory duration in rapid succession, of the user actuatable control switch actuator 13 (double tap), thereby causing the intensity of the electric lamp 114 to increase, at a second fade rate, from an off state or any intensity level to a maximum intensity level.

A FADE TO OFF response is effected by a single actuation of transitory duration of the user actuatable control switch actuator 13, thereby causing the intensity of the electric lamp 114 associated with the control unit 10 to decrease, at a third fade rate, from any intensity level to an off state.

A DELAY TO OFF response is effected by an "extended" actuation, i.e., a more than transitory actuation of the user actuatable control switch actuator 13, thereby causing the intensity of electric lamp 114 to decrease at the third fade rate, from any intensity level to an off state after a delay time. The duration of the delay time i.e., how long the delay time lasts from beginning to end, is dependent on the length of time the control switch actuator 13 is actuated. In the preferred embodiment the delay time is linearly proportioned to the length of time the control switch actuator 13 is actuated.

Actuations of less than 0.5 sec. are considered to be transitory or of short duration. Actuation of greater than 0.5 sec. cause an increase in the delay time of 10 seconds for each additional 0.5 second that control switch actuator 13 is actuated. Hence, if the control switch actuator 13 is held for two seconds, the delay time would be 30 seconds.

A variable fade to off could also be effected by an "extended" actuation of the control switch actuator 13, causing the intensity of electric lamp 114 to decrease from any intensity to off with a variable fade rate. The variable fade rate is dependent on the duration of the actuation. Whether the unit has variable delay or variable fade to off on extended actuation of the control switch actuator 13 is dependent on the programming of the microprocessor 108 shown in FIG. 10.

A LOCKED PRESET response is effected by a triple actuation, i.e., three actuations of transitory duration in rapid succession of the user actuatable control switch actuator 13 (triple tap). The intensity of the lamp 114 does not change but the intensity level is stored in a memory as a locked preset level, and subsequent changes to the intensity level of the lamp do not affect the locked preset level.

A DISCONTINUE LOCKED PRESET response is effected by a quadruple actuation, i.e., four actuations of transitory duration in rapid succession of the user actuatable control switch actuator 13 (quadruple tap). The intensity of the lamp 114 does not change, but any intensity level stored in memory as a locked preset level is cleared.

If a locked preset level is stored in memory and the control unit 10 is in an off state then a FADE TO PRESET response causes the intensity of the electric lamp 114 to increase to the locked preset level. If no locked preset level is stored in memory and the control unit 10 is in an off state, then a FADE TO PRESET response causes the intensity of the electric lamp 114 to increase to the level at which the lamp 114 was illuminated when the control unit 10 was last in an ON state.

Although the process of storing and clearing a locked preset level has been described with reference to multiple actuations of the control switch actuator 13, this could also be accomplished by using two additional separate switches, one to store a locked preset level and one to clear the locked preset level, or by using one additional switch, successive actuations of which would alternately store and clear the locked preset power level.

If a delay time has been stored by actuating the lower power level selector portion 12*b* when the control unit 10 is in the off state as described above, then a FADE TO OFF response effected by a single actuation of transitory duration of the user actuatable control switch actuator 13 when the control unit 10 is in the on state causes the lights to remain at their present intensity for the duration of the stored delay time and then to decrease at a third fade rate to an off state.

Figure 21:
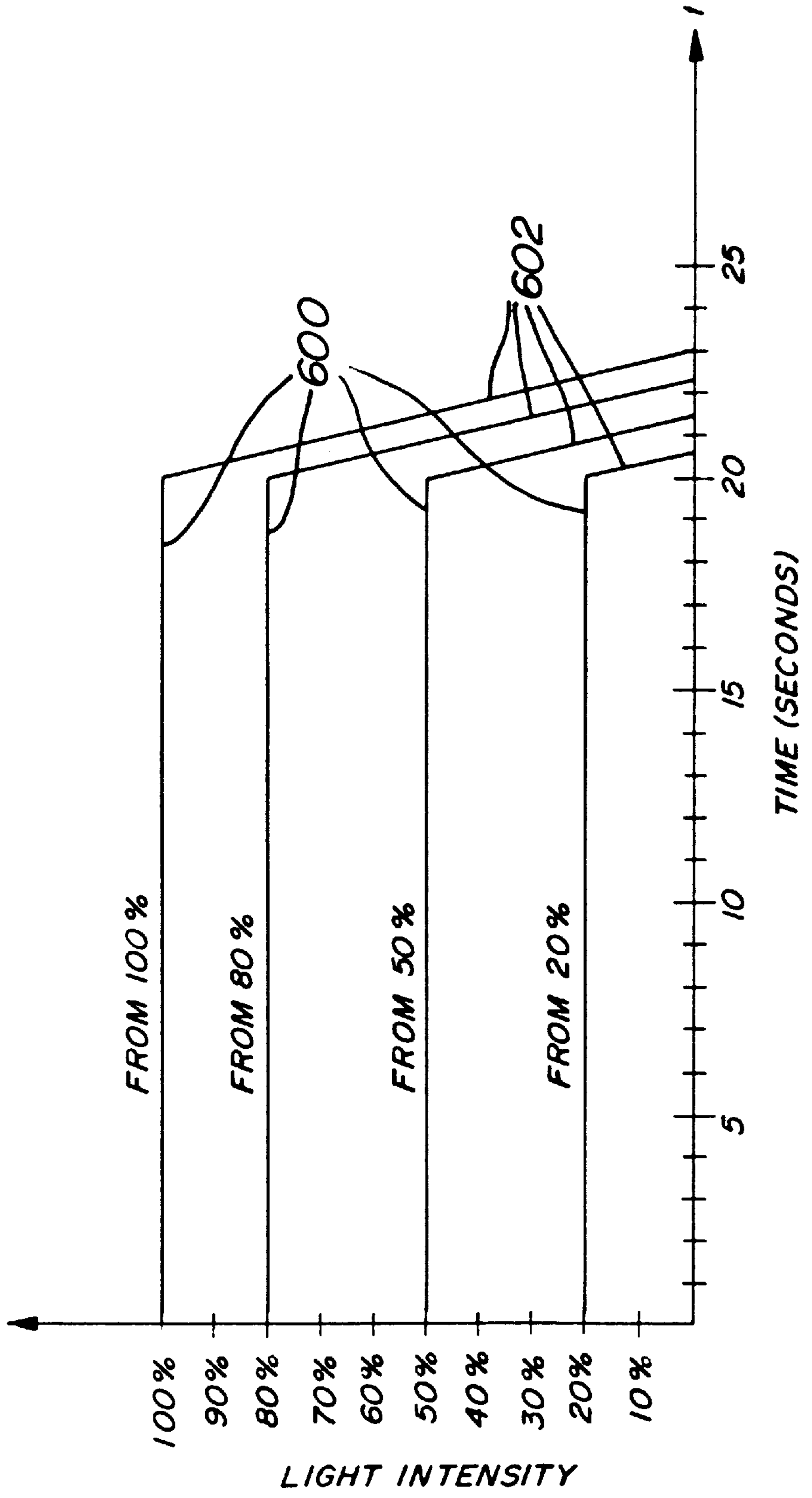
FIG. 21 illustrates delay to off profiles for the power control device shown in FIG. 1.

FIG. 21 illustrates delay to off profiles for a 20 second delay to off of the control unit 10. The profiles show how the light intensity levels of the lamp 114 change, starting from their current intensity level for four different beginning intensity levels. The lamp 114 remains at the current intensity level for the delay time in this case 20 seconds before the intensity of the lamp decreases to zero. The delay to off time is variable and the preferred embodiment has a variable delay to off time range of 10 to 60 seconds in 10 second increments. Although these delay times are presently preferred, it should be understood that the delay to off times and the associated fade rate to off at the end of the delay time are not the only ones which may be used with the invention, and any desired delay, fade rate or combination thereof may be employed without departing from the invention.

The control unit 10 will remain at the current intensity level 600 for the duration of the delay time. At the end of the delay time, the intensity of the lamp 114 decreases to zero. A suitable fade rate 602 for the decrease to zero may be 33% per second. Preferably the delay times and fade rates are stored in the form of digital data in the microprocessor 108, and may be called up from memory when required by the delay to off routine also stored in memory.

The delay to off profiles illustrated in FIG. 21 for a 20 second delay and similar profiles for the other possible delay to off times are used whether the control unit 10 is performing a DELAY TO OFF in response to an extended actuation of control switch actuator 13 or it is delaying to off with a previously stored delay time in response to transitory actuation of control switch actuator 13.

The control unit 10 and the cover plate 11 need not be limited to any specific form, and are preferably of a type adapted to be mounted to a conventional wall box commonly used in the installation of lighting control devices.

The selection actuator 12 and the control switch actuator 13 are not limited to any specific form, and may be of any suitable design which permits actuation by a user. Preferably, although not necessarily, the actuator 12 controls two separate momentary contact push switches 62*a*, 62*b*, but may also control a rocker switch, for example, without departing from the invention. Actuation of the upper portion 12*a* of the actuator 12 increases or raises the light intensity level, while actuation of lower portion 12*b* of the actuator 12 decreases or lowers the light intensity level. Preferably, but not necessarily, the actuator 13 controls a push-button momentary contact type switch 53, but the switch 53 may be of any other suitable type without departing from the scope of the present invention.

Similarly, although the effect of actuating the control switch actuator 13 is described above with respect to specific actuation sequences of control switch 13 having specific effects, i.e., FADE TO FULL is effected by a double tap and LOCKED PRESET is effected by a triple tap, the linkage between the specific actuation sequence and the specific effect can be changed without departing from the scope of the present invention. For example, in an alternative embodiment of the invention, FADE TO FULL could be effected by a triple tap.

The control unit 10 includes an intensity level indication in the form of a plurality of intensity level indicators 14. The indicators are preferably, but need not be, light-emitting diodes (LEDs) or the like. Although the intensity level indicators 14 may occasionally be referred to herein for convenience as LEDs, it should be understood that such a reference is for ease of describing the invention and is not intended to limit the invention to any particular type indicator. Intensity level indicators 14 are arranged, in this embodiment, in a linear array representing a range of light intensities of the one or more lamps controlled by the control unit 10. The range of light intensities is from a minimum (zero, or "off") to a maximum intensity level ("full on"). A visual indication of the light intensity of the controlled lights is displayed by the illumination of a single intensity level indicator 14 preferably at 100% of its output when the lamps are on.

The intensity level indicators 14 of the preferred embodiment illustrated in FIG. 1 show seven indicators aligned vertically in a linear array. By illuminating the uppermost indicator in the array, maximum light intensity level is indicated. By illuminating the center indicator, an indication is given that the light intensity level is at about the midpoint of the range, and by illuminating the lowermost indicator in the array, the minimum light intensity level is indicated.

Any convenient number of intensity level indicators 14 can be used. By increasing the number of indicators in an array, the finer the gradation between intensity levels within the range can be achieved. In addition, when the lamp or lamps being controlled are off, all of the intensity level indicators 14 can be constantly illuminated at a low level of illumination preferably at 0.5% of their maximum output for convenience of the user. The indicator representing the actual intensity level of the lamps when they return to the on state is illuminated at a slightly higher illumination level, preferably at 2% of its maximum output. These illumination characteristics enable the intensity level indicators 14 to be more readily perceived by the eye in a darkened environment, thereby assisting a user in locating the switch in a dark room, and constitute a "night light mode". An important feature of the present invention, in addition to controlling the lights in the room, is to provide sufficient contrast between the level indicators to enable a user to perceive the actual intensity level at a glance.

The intensity level indicators 14 are also used to provide feedback to the user of the control unit 10 regarding how the control unit 10 is responding to the various actuations of control switch actuator 13 and selection switch actuator 12.

For example, when a FADE TO PRESET response is effected by a single actuation of transitory duration of control switch actuator 13 when the control unit 10 is in the off state, the intensity level indicators 14 change from the "night light mode" to illuminating the lowermost indicator followed by illuminating successively higher indicators in turn as the light intensity increases until the indicator which indicates the intensity of the preset light level is illuminated.

Further, when a FADE TO FULL response is effected by a double tap of the control switch actuator 13, the intensity level indicators change from their original condition to illuminating successively higher indicators in turn until the uppermost indicator in the array is illuminated as the light intensity increases to full.

Further, when a FADE TO OFF response is effected by a single actuation of transitory duration of the control switch actuator 13 when the control unit 10 is in the on state, the intensity level indicators 14 change from their original condition to illuminating successively lower indicators in turn as the light intensity decreases to its lowest level. Finally, the intensity level indicators 14 indicate the "night light mode" when the light intensity decreases to zero.

Further, when a DELAY TO OFF response is effected by extended actuation of the control switch actuator 13 when the control unit 10 is in the on state, the intensity level indicators 14 first indicate the length of the delay time selected. After the control switch actuator 13 has been held closed for 0.5 seconds, the lowermost indicator will cycle on and off to indicate that a 10 second delay has been selected, after a further 0.5 seconds the next highest indicator will cycle on and off to indicate that a 20 second delay has been selected, and so on, with successively higher indicators cycling on and off until the control switch actuator 13 is released.

When the control switch actuator 13 is released, the indicator indicating the present light intensity level cycles on and off during the delay time. At the end of the delay time, the indicator which indicates the present level is illuminated and then successively lower indicators are illuminated as the light decreases to its lowest level. Finally, the intensity level indicators 14 indicate the "night light mode" when the light intensity decreases to zero.

When a LOCKED PRESET response is effected by a triple actuation of the control switch actuator 13, the intensity level indicator indicating the current light level of the lamp flashes twice at a frequency of 2 Hz to indicate that the intensity level has been successfully stored.

When a DISCONTINUE LOCKED PRESET response is effected by a quadruple actuation of the control switch actuator 13, the intensity level indicator indicating the current light level of the lamp flashes twice at a frequency of 2 Hz to indicate that the intensity level has been cleared from memory.

When a RAISE response is effected by actuation of the upper portion 12*a* of the selection actuator 12, the intensity level indicators 14 change from their original condition to illuminating successively higher indicators in turn as the actuation continues until either the actuation ends or the uppermost indicator in the array is illuminated when the light intensity reaches a maximum.

When a LOWER response is effected by actuation of the lower portion 12*b* of selection actuator 12 while the control unit 10 is in the on state, the intensity level indicators 14 change from their original condition to illuminating successively lower indicators as the actuation continues until either the actuation ends or the lowermost indicator in the array is illuminated when the light intensity reaches a minimum. The control unit 10 does not turn off.

Finally, if the lower portion 12*b* of the selection actuator 12 is actuated when the control unit 10 is in the off state, the intensity level indicators 14 initially indicate the "night light mode". After the lower portion 12*b* has been actuated for 4.0 seconds, the lowermost indicator will cycle on and off to indicate that a 10 second delay has been selected, after a further 0.5 seconds the next highest indicator will cycle on and off to indicate that a 20 second delay has been selected, and so on, with successively higher indicators cycling on and off until the lower portion 12*b* is released. When the lower portion 12*b* is released, the indicator indicating the delay time selected flashes twice at a frequency of 2 Hz to indicate that the delay time has been successfully stored and then the intensity level indicators 14 return to the "night light mode".

WIRELESS TRANSMITTER UNITS

One embodiment of a basic infrared signal transmitting wireless remote control unit 20 suitable for use with the control unit 10 is shown in FIGS. 2, 2A, 2B and 2C.

The basic wireless control unit 20 comprises a plurality of control actuators, comprising a user actuatable transmitter power level selection actuator 23 and associated intensity selection switches 223 and a user actuatable transmitter control switch actuator 21 and associated transmitter control switch 221. Transmitter selection actuator 23 further comprises an increase power level selector portion 23*a* and a decrease power level selector portion 23*b*, controlling respective intensity selection switches 223*a*, 223*b*.

Figure 11:
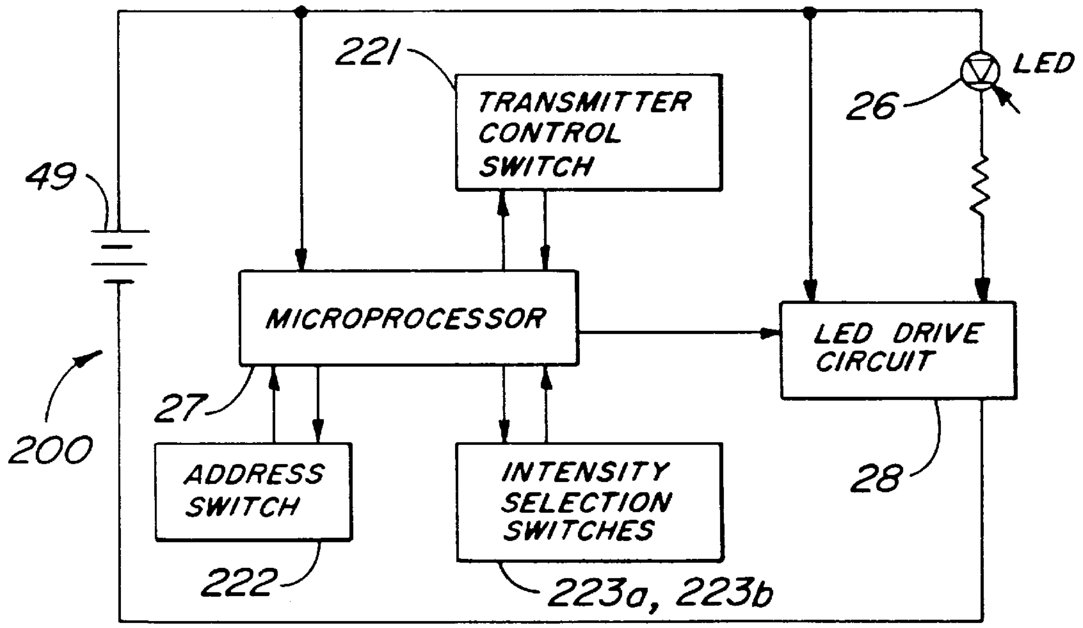
FIG. 11 shows a block diagram of the circuitry of the basic remote control unit shown in FIG. 2.

The basic wireless control unit 20 further comprises an infra-red transmitting diode 26 which is located in an opening 25 in an end 24 of the basic wireless control unit 20 as best seen in FIG. 2C. Alternatively, basic wireless control unit 20 can further comprise an address switch 222 and an address switch actuator 22, which may be used in conjunction with a "send address" switch (not shown) as will be described in more detail below. The switches 221, 222, 223*a*, 223*b* are shown in FIG. 11.

Actuation of the increase power level selector portion 23*a*, the lower power level selector portion 23*b*, or the transmitter control switch actuator 21 of basic wireless remote control unit 20 generally has the same effect as actuating the upper power level selector portion 12*a*, the lower power level selector portion 12*b* or the control switch actuator 13 respectively of the control unit 10.

The actuation of the actuators 23*a*, 23*b*, 21 on the basic wireless remote control unit 20 closes the respective switches 223*a*, 223*b*, 221 which they actuate. The switch closure is detected by a microprocessor 27 and the information about which actuator has been operated is transmitted via infra-red signals from the infra-red transmitting diode 26 as will be described in more detail below in connection with the description of FIGS. 6 and 11.

The infrared signals are detected by an infra-red receiver 104 and the signal information is passed to a microprocessor 108 which interprets the signal information as will be described in more detail below in connection with the description of FIGS. 10 and 13 to 20.

In general, actuating an actuator on the basic wireless remote control unit 20 has the same effect as operating the corresponding actuator on the control unit 10. Thus, actuating the transmitter control switch actuator 21 for a transitory period of time will have the same effect as operating the control switch actuator 13 on the control unit 10 for a transitory period of time. (As described above, the exact effect may vary depending on the state of the control unit 10 prior to the actuation). However, if desired, certain functions may be accessed only from the control unit 10 and not from basic wireless remote control unit 20 or vice versa. For example, the triple tap of transmitter control switch actuator 21 could have no effect on the control unit 10, whereas the triple tap of control switch actuator 13 could have the effect described above.

Figure 3:
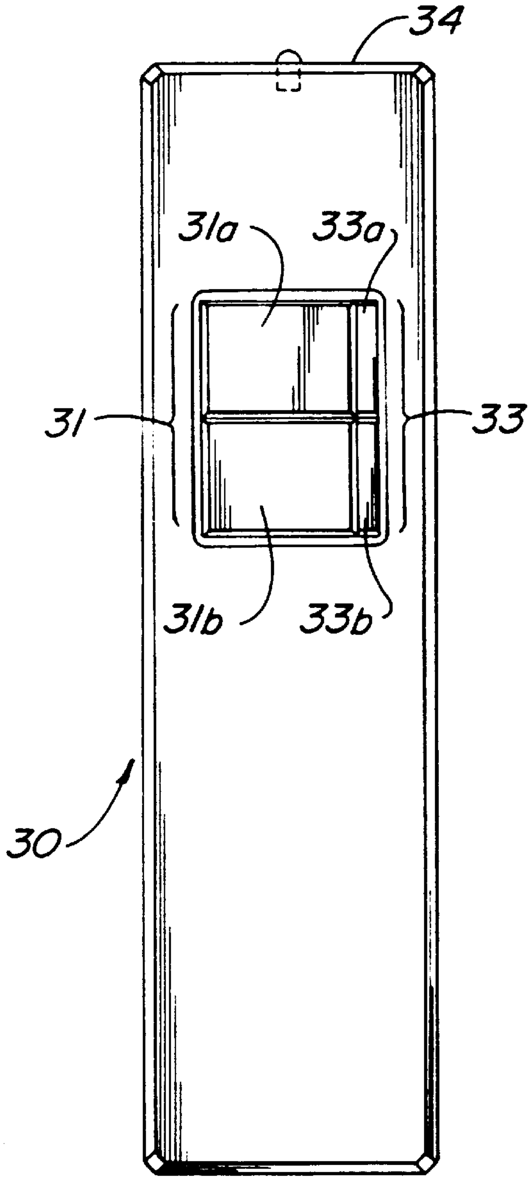
FIG. 3 shows a top view of a preferred embodiment of a wireless enhanced transmitter unit in accordance with the present invention.
Figure 3A:
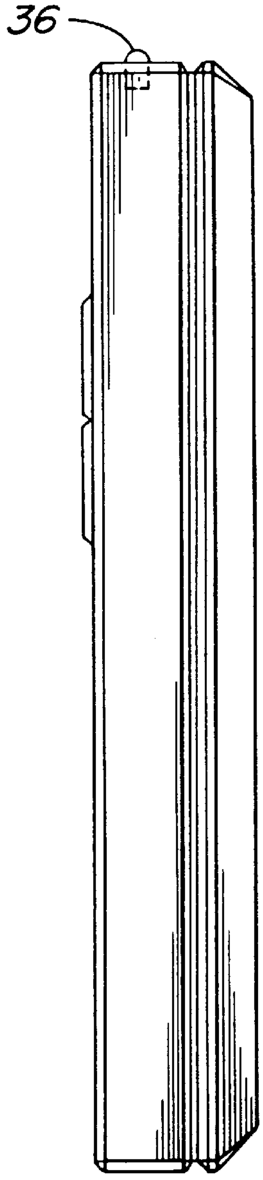
FIG. 3A shows a right side view of the enhanced transmitter unit as shown in FIG. 3.
Figure 3B:
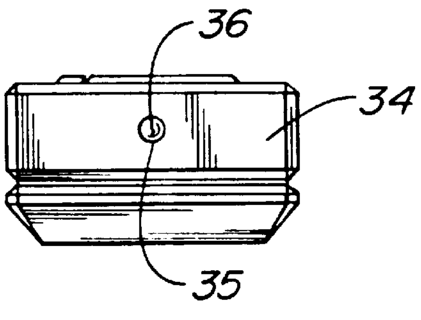
FIG. 3B shows an end view of the enhanced transmitter unit as shown in FIG. 3.

One embodiment of an enhanced infra-red signal transmitting wireless remote control unit 30 suitable for use with the control unit 10 is shown in FIGS. 3, 3A and 3B. The enhanced wireless control unit 30 comprises a plurality of control actuators, comprising a user actuatable transmitter power level selection actuator 33 and associated intensity selection switches 333, and a user actuatable transmitter scene control actuator 31 and associated switches 331. Transmitter selection actuator 33 further comprises an increase power level selector portion 33*a* and a decrease power level selector portion 33*b*, controlling respective intensity selection switches 333*a* and 333*b*, and scene the control actuator 31 further comprises a scene select actuator 31*a* and an off actuator 31*b* controlling respective scene control switches 331*a*, 331*b*.

Figure 12A:
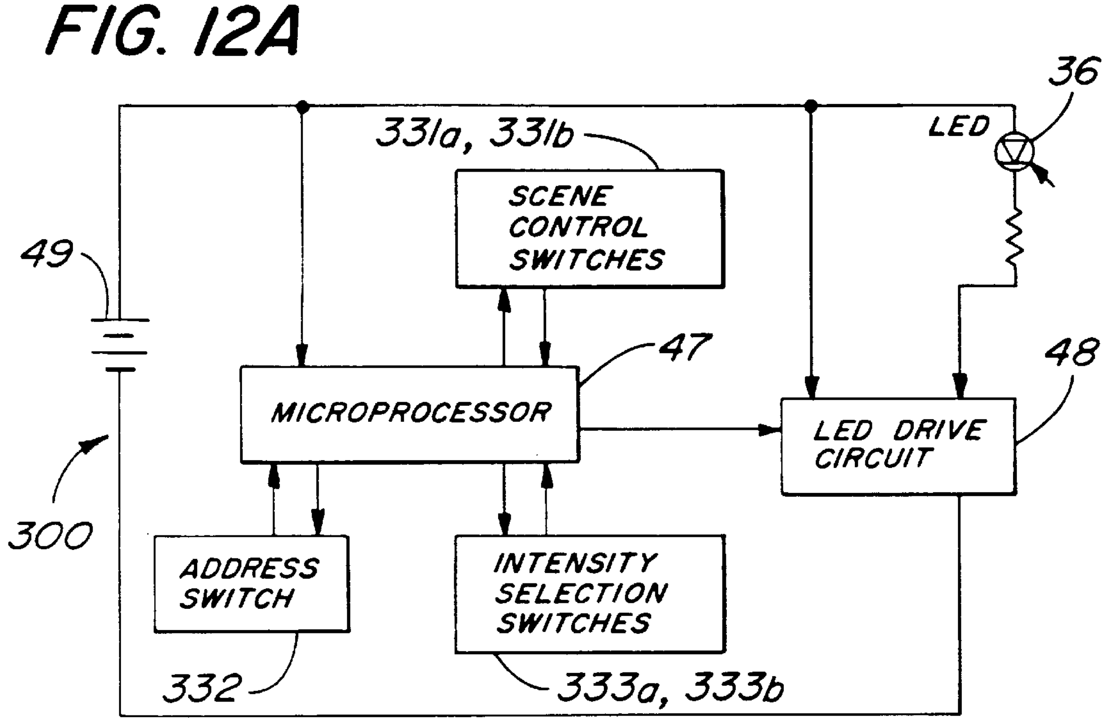
FIG. 12A shows a block diagram of the circuitry the enhanced remote control unit shown in FIG. 3.

The enhanced wireless control unit 30 further comprises an infra-red transmitting diode 36 which is located in an opening 35 in an end 34 of the enhanced wireless control unit 30 as best seen in FIG. 2B. Alternatively the enhanced wireless control unit 30 can further comprise an address switch 332 and address switch actuator (not shown but the same as the address switch actuator 22 used with the basic wireless control unit 20). The switches 331*a*, 331*b*, 332, 333*a*, 333*b* are shown in FIG. 12A.

Actuation of the increase power level selector portion 33*a* or the lower power level selector portion 33*b* of the enhanced wireless control unit 30 generally has the same effect as actuating the upper power level selector portion 12*a* or the lower power level selector portion 12*b* of the control unit 10, respectively.

Actuation of the scene select actuator 31*a* for a transitory period of time causes the light intensity of the electric lamp 114 to change at the first fade rate from its present intensity level (which can be off) to a first preprogrammed preset intensity level.

Actuation of the scene select actuator 31*a* for two transitory periods of time in rapid succession causes the light intensity of the electric lamp 114 to change at the first fade rate from its present intensity level (which can be off) to a second preprogrammed preset intensity level.

The method for preprogramming the preset intensity levels will be described in detail below.

Actuation of the off actuator 31*b* generally has the same effect as actuating the control switch actuator 13 of the control unit 10 when the control unit 10 is in an on state and is delivering a non-zero power level to the lamp under control; and has no effect when the control unit 10 is in an off state and delivering zero power to the lamp. Hence, by actuating the off actuator 31*b*, it is possible to effect a fade to off response or a delay to off response from the control unit 10.

The actuation of the actuators 33*a*, 33*b*, 31*a*, 31*b* which they actuate on the enhanced wireless remote control unit 30 closes the respective switches 333*a*, 333*b*, 331*a*, 331*b*. The switch closure is detected by a microprocessor 47, and the information about which actuator has been operated is transmitted via infra-red signals from the infra-red transmitting diode 36 as will be described in more detail below in connection with the description of FIGS. 6 AND 12A.

The infrared signals are detected by an infra-red receiver 104 and the signal information is passed to a microprocessor 108 which interprets the signal information as will be described in more detail below in connection with the description of FIGS. 10 AND 13–20.

Figure 4:
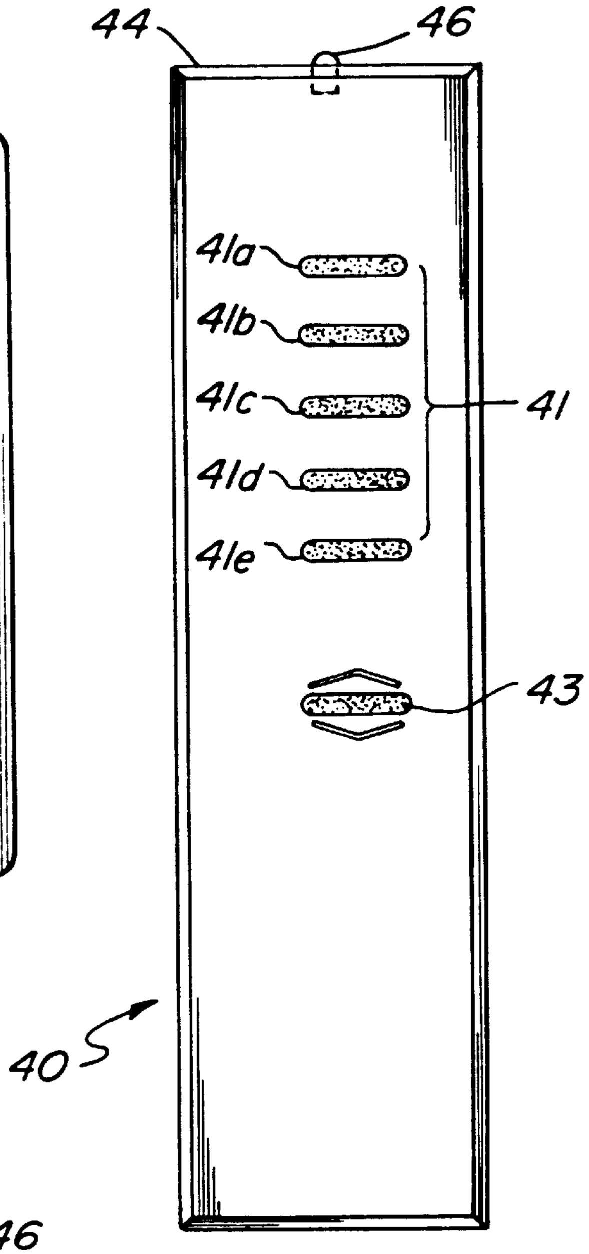
FIG. 4 shows a top view of an alternate preferred embodiment of a wireless transmitter unit having scene controls in accordance with the present invention.
Figure 4A:
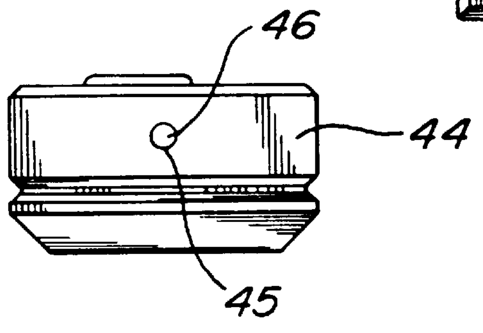
FIG. 4A shows an end view of the wireless transmitter unit having as shown in FIG. 4.

A second embodiment of an enhanced infra-red transmitting wireless remote control unit 40 suitable for use with the control unit 10 is shown in FIGS. 4 AND 4A. The enhanced wireless control unit 40 comprises a plurality of control actuators, comprising a user actuatable transmitter power level selection actuator 43 and associated intensity selection switches 443, and user actuatable transmitter scene control actuators 41 and associated switches 441. The transmitter selection actuator 43 is a paddle actuator which is moved upwards to actuate increase intensity selection switch 443*a* and is moved downwards to actuate decrease intensity selection switch 443*b*. The scene control actuators 41 comprise scene select actuators 41*a*, 41*b*, 41*c*, 41*d* and an off actuator 41*e* controlling respective scene control switches 441*a*, 441*b*, 441*c*, 441*d*, 441*e*.

Figure 12B:
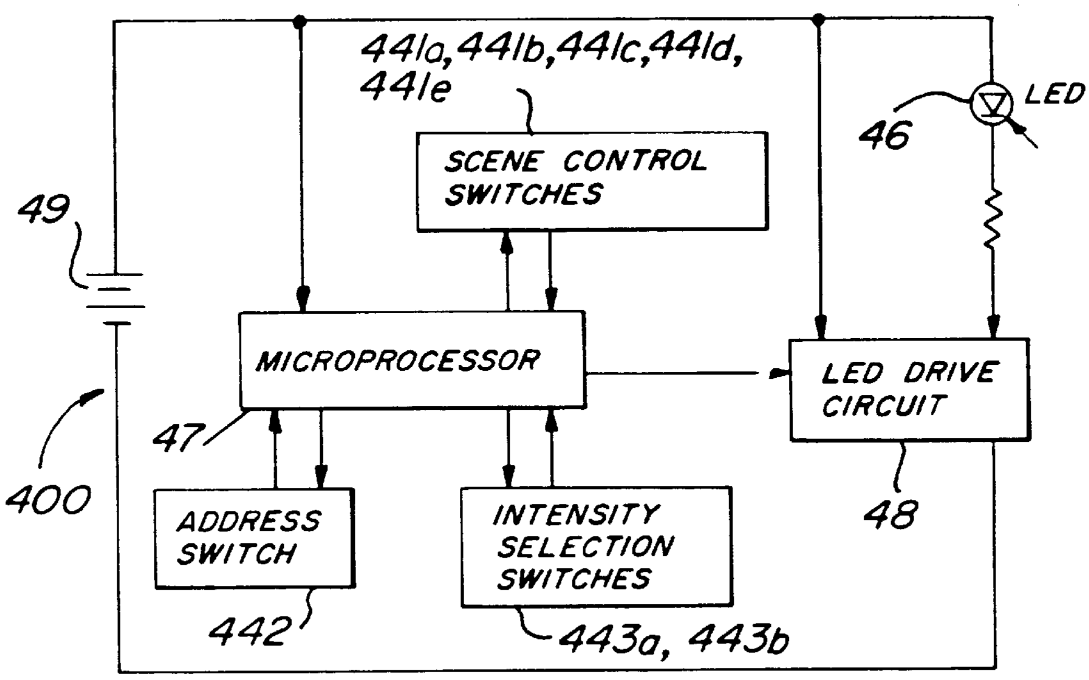
FIG. 12B shows a block diagram of the circuitry of the enhanced remote control unit shown in FIG. 4.

The enhanced wireless control unit 40 further comprises an infra-red transmitting diode 46 which is located in an opening 45 in an end 44 of the enhanced wireless control unit 40 as best seen in FIG. 4A. Alternatively enhanced wireless control unit 40 can further comprise an address switch 442 and an address switch actuator (not shown but the same as the address switch actuator 22 used with the basic wireless control unit 20). The switches 441*a*, 441*b*, 441*c*, 441*d*, 441*e*, 442, 443*a*, 443*b* are shown in FIG. 12B.

Actuation of increase intensity switch 443*a* by moving the transmitter selection actuator upward generally has the same effect as actuating the upper power level selector portion 12*a* of the control unit 10. Similarly, actuation of decrease intensity selection switch 443*b* by moving the transmitter selection actuator downward generally has the same effect as actuating the lower power level selector portion 12*b* of the control unit 10.

Actuation of each of the scene select actuators 41*a*, 41*b*, 41*c*, 41*d* for a transitory period of time causes the light intensity of the electric lamp 114 to change at the first fade rate from its present intensity level (which can be off) to first, second, third, and fourth preprogrammed preset intensity levels, respectively.

Actuation of each of the scene select actuators 41*a*, 41*b*, 41*c*, 41*d* for two transitory periods of time in rapid succession causes the light intensity of the electric lamp 114 to change at the first fade rate from its present intensity level (which can be off) to fifth, sixth, seventh, and eighth preprogrammed preset intensity levels, respectively.

The method for preprogramming the preset intensity levels will be described in detail below.

Actuation of the off actuator 41*e* generally has the same effect as actuating the control switch actuator 13 of the control unit 10 when the control unit 10 is in an on state and is delivering a non-zero power level to the lamp under control; and has no effect when control unit 10 is in an off state and delivering zero power to the lamp. Hence, by actuating the off actuator 41*e*, it is possible to effect a fade to off response or a delay to off response from the control unit 10.

The actuation of the actuators 43, 41*a*, 41*b*, 41*c*, 41*d*, 41*e* on the enhanced wireless remote control unit 30 closes the respective switches 443*a*, 443*b*, 441*a*, 441*b*, 441*c*, 441*d*, 441*e* which they actuate. The switch closure is detected by a microprocessor 47, and the information about which actuator has been operated is transmitted via infra-red signals from the infra-red transmitting diode 46 as will be described in more detail below in connection with the description of FIGS. 6 AND 12B.

The infra-red signals are detected by an infra-red receiver 104 and the signal information is passed to a microprocessor 108 which interprets the signal information as will be described in more detail below in connection with the description of FIGS. 10 AND 13–20.

Figure 5:
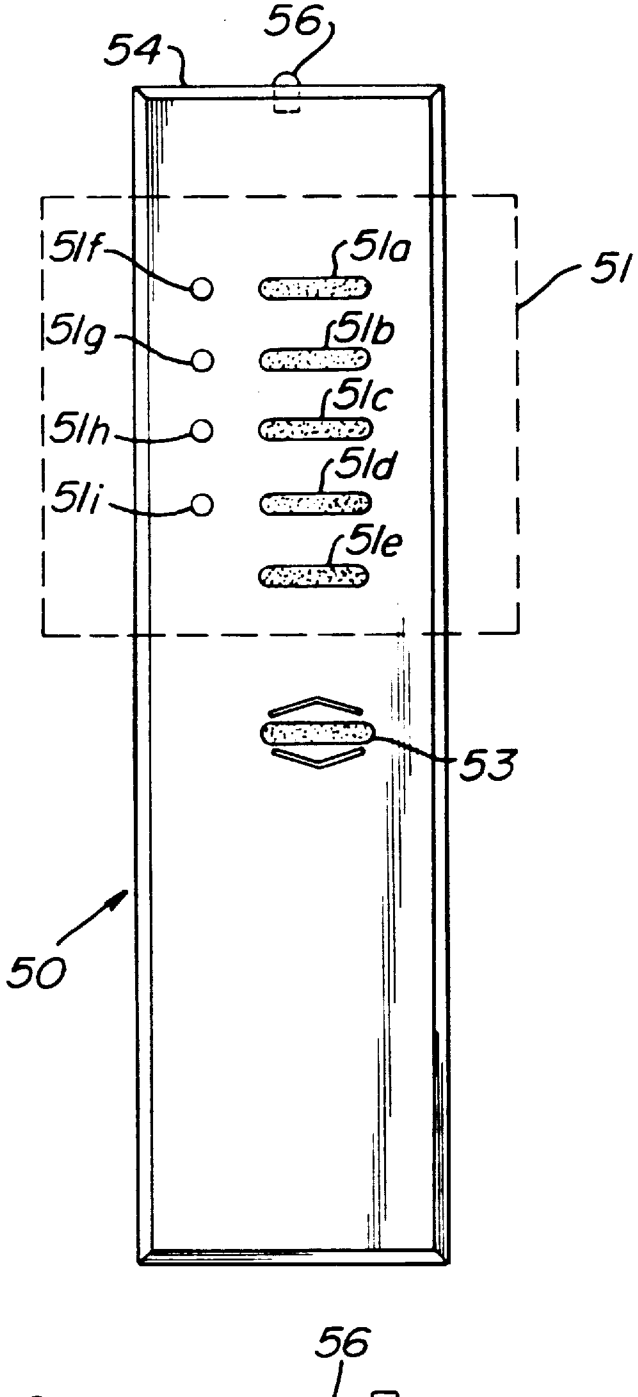
FIG. 5 shows a top view of an alternate embodiment of a preferred wireless enhanced transmitter unit having scene and special function controls and in accordance with the present invention.
Figure 5A:
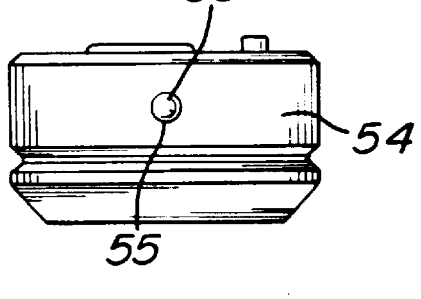
FIG. 5A shows an end view of the alternate enhanced transmitter unit as shown in FIG. 5.

A third embodiment of an enhanced infra-red transmitting wireless remote control unit 50 suitable for use with the control unit 10 is shown in FIGS. 5 AND 5A.

The enhanced wireless control unit 50 comprises a plurality of control actuators comprising a user actuatable transmitter power level selection actuator 53 and associated intensity selection switches 553, and user actuatable transmitter scene control actuators 51 and associated switches 551. The transmitter selection actuator 53 is a paddle actuator which is moved upwards to actuate increase intensity selection switch 553*a* and is moved downwards to actuate decrease intensity selection switch 553*b*. The scene control actuators 51 comprise scene select actuators 51*a*, 51*b*, 51*c*, 51*d* and an off actuator 51*e* controlling respective scene control switches 551*a*, 551*b*, 551*c*, 551*d*, 551*e*. The scene control actuator 51 further comprise special function select actuators 51*f*, 51*g*, 51*h*, 51*i* controlling respective special function control switches 551*f*, 551*g*, 551*h*, 551*i*.

Figure 12C:
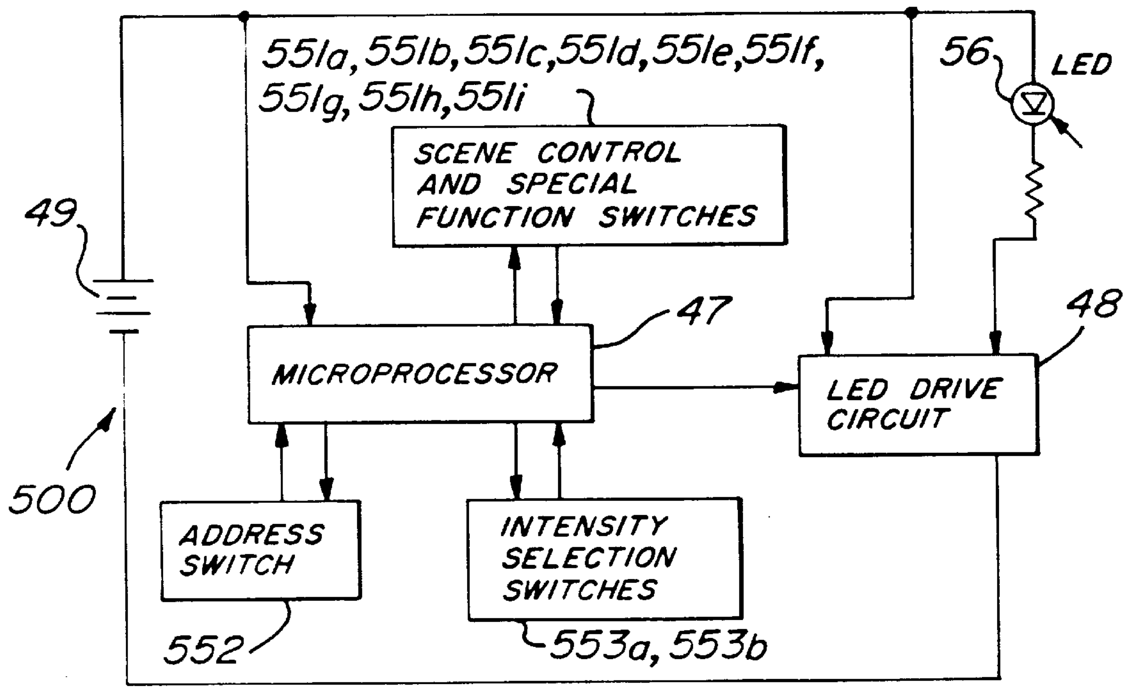
FIG. 12C shows a block diagram of the circuitry of the enhanced remote control unit shown in FIG. 5.

The enhanced wireless control unit 50 further comprises an infra-red transmitting diode 56 which is located in an opening 55 in an end 54 of the enhanced wireless control unit 50 as best seen in FIG. 5A. Alternatively enhanced wireless control unit 50 can further comprise an address switch 552 and an address switch actuator (not shown but the same as the address switch actuator 22 used with the basic wireless control unit 20). The switches 551*a*, 551*b*, 551*c*, 551*d*, 551*e*, 551*f*, 551*g*, 551*h*, 551*i*, 552, 553*a*, 553*b* are shown in FIG. 12C.

Actuation of increase intensity switch 553*a* by moving the transmitter selection actuator upward generally has the same effect as actuating the upper power level selector portion 12*a* of the control unit 10. Similarly, actuation of decrease intensity selection switch 553*b* by moving the transmitter selection actuator downward generally has the same effect as actuating the lower power level selector portion 12*b* of the control unit 10.

Actuation of each of the scene select actuators 51*a*, 51*b*, 51*c*, 51*d* for a transitory period of time causes the light intensity of the electric lamp 114 to change at the first fade rate from its present intensity level (which can be off) to first, second, third, and, fourth preprogrammed preset intensity levels, respectively.

Actuation of each of the scene select actuators 51*a*, 51*b*, 51*c*, 51*d* for two transitory periods of time in rapid succession causes the light intensity of the electric lamp 114 to change at the first fade rate from its present intensity level (which can be off) to fifth, sixth, seventh, and eighth preprogrammed preset intensity levels, respectively.

The third embodiment 50 of the enhanced transmitter differs from the second embodiment 40 of the enhanced transmitter in that it further comprises special function actuators 51*f*, 51*g*, 51*h*, 51*i* controlling respective special function switches 551*f*, 551*g*, 551*h*, 551*i*. These special function actuators can be used to select ninth, tenth, eleventh, and twelfth preprogrammed preset intensity levels, respectively, or to select special functions. Alternatively, some special function actuators can be used to select preprogrammed preset intensity levels and some can be used to select special functions.

The method for preprogramming the preset intensity levels and the nature of the special functions will be described in detail below.

Actuation of the off actuator 51*e* generally has the same effect as actuating the control switch actuator 13 of the control unit 10 when the control unit 10 is in an on state and is delivering a non-zero- power level to the lamp under control; and has no effect when control unit 10 is in an off state and delivering zero power to the lamp. Hence, by actuating the off actuator 51*e*, it is possible to effect a fade to off response or a delay to off response from the control unit 10.

The actuation of the actuators 53, 51*a*, 51*b*, 51*c*, 51*d*, 51*e*, 51*f*, 51*g*, 51*h*, 51*i* on the enhanced wireless remote control unit 30 closes the respective switches 553*a*, 553*b*, 551*a*, 551*b*, 551*c*, 551*d*, 551*e*, 551*f*, 551*g*, 551*h*, 551*i* which they actuate. The switch closure is detected by a microprocessor 47, and the information about which actuator has been operated is transmitted via infra-red signals from the infra-red transmitting diode 56 as will be described in more detail below in connection with the description of FIGS. 6 AND 12C.

The infra-red signals are detected by an infra-red receiver 104 and the signal information is passed to a microprocessor 108 which interprets the signal information as will be described in more detail below in connection with the description of FIGS. 10 AND 13–20.

The method for preprogramming the preset intensity levels accessed from the enhanced wireless control units 30, 40, 50 is similar for each of the enhanced remote controls.

Programming mode for the control unit 10 is entered by actuating a combination of actuators on the enhanced remote controls and keeping the switches controlled by the actuators closed for a certain length of time, preferably 3 seconds, while transmitting infra-red signals from the transmitter to control unit 10 at which time the control unit 10 enters programming mode.

For the embodiment of the enhanced remote control 30 illustrated in FIGS. 3, 3A AND 3B, programming mode is entered by actuating the scene select actuator 31*a* and the off actuator 31*b* at the same time. For the embodiment 40 illustrated in FIGS. 4 AND 4A, programming mode is entered by actuating the scene select actuator 41*a* and the off actuator 41*e* at the same time. For the embodiment 50 illustrated in FIGS. 5 AND 5A, programming mode is entered by actuating the scene select actuator 51*a* and the off actuator 51*e* at the same time.

The control unit 10 enters the programming mode ready to program the first preset intensity level. The uppermost indicator 14 (which is indicating that the first preset intensity level is being programmed) flashes on and off with a duty cycle of approximately 10% and the indicator 14 corresponding to the light intensity level currently programmed as the first preset intensity level flashes on and off with a 90% duty cycle. Duty cycle here refers to the relative amount of time that one indicator 14 is on as opposed to another indicator 14 being on. Only one indicator 14 is ever illuminated at one time due to constraints within the power supply powering the indicator 14.

The light intensity level to be stored is adjusted by actuating the increase power level selector portion 33*a* or lower power level selector portion 33*b* or the off actuator 31*b* for the embodiment of the enhanced remote control 30 illustrated in FIGS. 3, 3A AND 3B, by actuating the power level selection actuator 43 either up or down to actuate increase intensity selection switch 443*a* or decrease intensity selection switch 443*b* or the off actuator 41*e* for the embodiment of the enhanced remote 40 illustrated in FIGS. 4 AND 4A, by actuating the power level selection actuator 53 either up or down to actuate increase intensity selection switch 553*a* or decrease intensity selection switch 553*b* or the off actuator 51*e* for the embodiment of the enhanced remote 50 illustrated in FIGS. 5 AND 5A. For all embodiments of the enhanced remote control 30, 40, 50, the light intensity to be stored can also be adjusted by actuating the upper power level selection portion 12*a* and the lower power level selector portion 12*b* of the control unit 10.

As the intensity is adjusted, the light intensity of electric lamp 114 changes and the indicator 14 which is illuminated with a 90% duty cycle also changes to indicate the new current light level.

Once the desired intensity level to be programmed as the first preset intensity level (which may be off), has been reached either another preset intensity level to be programmed is selected or programming mode is exited. In the case of the enhanced remote control 30 illustrated in FIGS. 3, 3A AND 3B, only a first preset intensity level can be programmed, so the only option at this point is to exit programming mode.

If it is desired to program another preset intensity level, then this is selected by actuating a scene select actuator 41*b*, 41*c*, 41*d* for a transitory period of time for the embodiment of the enhanced remote control illustrated in FIGS. 4 AND 4A or a scene select actuator 51*b*, 51*c*, 51*d* for a transitory period of time for the embodiment of the enhanced remote control illustrated in FIGS. 5 AND 5A.

These scene select actuators select second, third, and fourth preset intensity levels to be programmed respectively. The second highest indicator 14 flashes on and off with a 10% duty cycle when the second preset intensity level has been selected, the third highest indicator 14 flashes on and off with a 10% duty cycle when the third preset intensity level has been selected and the middle indicator 14 flashes on and off with a 10% duty cycle when the fourth preset intensity level has been selected.

Actuating a scene select actuator 41*a*, 41*b*, 41*c*, 41*d*, 51*a*, 51*b*, 51*c*, 51*d* for two transitory periods of time enables the selection of the fifth, sixth, seventh, and eighth preset intensity levels to be programmed, respectively.

The highest, second highest, third highest, and middle indicator 14 will flash on and off with a duty cycle other than 10% to indicate that either the fifth, sixth, seventh, or eighth preset intensity level to be programmed has been selected.

If the embodiment of the enhanced transmitter 50 illustrated in FIGS. 5 AND 5A is being used to select ninth, tenth, eleventh, and twelfth preset intensity levels from the special function actuators 51*f*, 51*g*, 51*h*, 51*i*, these can be selected for programming by actuating a special function actuator 51*f*, 51*g*, 51*h*, 51*i*.

The highest, second highest, third highest, and middle indicator 14 will flash on and off with a second duty cycle other than 10% to indicate that either the ninth, tenth, eleventh, or twelfth preset intensity level to be programmed has been selected.

The light intensity to be stored is adjusted in the same manner as described above for programming the first preset intensity level.

Once all the desired preset intensity levels have been programmed, programming mode is exited by actuating the same combination of actuators which were used to enter programming mode again for a period of time, preferably 3 seconds, while transmitting infra-red signals from the transmitter to the control unit 10. At the end of the period, the control unit exits programming mode. Alternatively, programming mode can be exited by actuating actuator 13 on control unit 10 for a transitory period of time.

The operation of the special function actuators 51*f*, 51*g*, 51*h*, 51*i* on the enhanced transmitter 50 is dependant on the particular special functions programmed into the control unit 10 which receives the infrared signals.

One alternative is to use the special function selection actuator to select additional programmed intensity levels as described above. A first special function which can be selected by a first special function actuator is "FADE TO OFF WITH DETERMINED FADE TIME". This function is similar to "DELAY TO OFF" except that, whereas in the case of the "DELAY TO OFF" the light intensity of lamp 114 remains at its current intensity during the delay time and then decreases to zero over a relatively short period of time, in the case of "FADE TO OFF WITH DETERMINED FADE TIME" the light intensity level of lamp 114 immediately begins to decrease in value once the actuator is released and then continues to decrease in value until it reaches zero at the end of the "DETERMINED FADE TIME".

The "DETERMINED FADE TIME" is determined by the length of time that the first special function actuator has been actuated. The longer the actuator is actuated, the longer the fade time.

After the first special function actuator has been actuated the indicator 14 will flash the lowest LED to indicate a fade time of 10 sec has been selected. For each additional 0.5 sec that the first special function actuator is actuated the fade time increases by 10 sec to a maximum of 60 sec. Successively higher indicators 14 are flashed to indicate the increasing fade time selected. When the first special function actuator is released, the decrease in light intensity of lamp 114 begins to occur and the indicator 14 indicating the current light intensity is flashed. Successively lower indicators 14 are flashed as the light intensity of lamp 14 is decreased until the indicator 14 indicates the "Night light mode" when lamp 114 is at zero power.

A second special function which can be selected by a second special function actuator is "RETURN TO PREVIOUS LIGHT LEVEL". This function causes the light intensity of lamp 114 to return to the last preset level it had prior to the last actuation of a scene select actuator, a control switch actuator, or a power level selector actuator.

In this way it is possible for the user of the control unit 10 to return to the last selected preset level which could be a preprogrammed preset intensity level, a locked preset intensity level or an unlocked preset intensity level. The intensity level of lamp 114 will gradually increase or decrease from the current intensity level to the intensity level being returned to, and the indicator 14 will change from illuminating the LED corresponding to the current intensity level to illuminating successively higher or lower LEDs until the indicator 14 indicating the intensity level of the last selected preset level is illuminated.

Other special functions can optionally be programmed into the control unit 10 and selected by actuating different special function actuators.

The operation of the optional address switch actuator 22 and address switch 222, 332, 442, 552 and the send address switch (not shown) is similar for the basic wireless control unit 20, and the three embodiments of the enhanced wireless control unit 30, 40, 50.

The first use of the optional address switch actuator 22 and the send address switch is to label control unit 10 with a particular address. Address switch actuator 22 controls an address switch, 222, 332, 442, 552 which is typically a multiposition switch, for selecting between different address A, B, C, D, etc. If it is desired to label a particular control unit 10 with address B, then the address switch actuator would be adjusted to select B, and then the send address switch would be actuated. The send address switch is not shown, but could have any desired form. Preferably, the send address switch is actuated by a small and inconspicuous actuator since it is used infrequently. Alternatively, the actuator for the send address switch could be hidden under normal use for, for example under a battery compartment cover for the wireless control unit 20, 30, 40, 50.

Alternatively in the case of the three embodiments of enhanced wireless control unit 30, 40, 50, the function of the send address switch could be obtained by actuating a combination of the existing actuators, for example the off actuator 31*b*, 41*e*, 51*e* and the upper power level selector portion 33*a*, or moving the transmitter selection actuator 43, 53 upwards.

After the send address switch has been actuated or the appropriate combination of actuators has been actuated, an infrared signal is sent from the wireless control unit 20, 30, 40, 50 which commands any control unit 10 which receives the signal to label itself with address B. The intensity level indicator 14 indicating the current intensity level of the lamp flashes three times at a frequency of 2 Hz to indicate that the address has been successfully received and stored in a memory.

Alternatively, the intensity level indicator 14 indicating the current intensity level of the lamp 114 flashes at a frequency of 2 Hz until the control switch actuator 13 is actuated for a transitory period of time to store the address in memory. If actuator 13 has not been actuated within 2 minutes of the control unit 10 receiving the infra-red signal, then no address is stored and the control unit 10 returns to the state which it was in prior to receiving the infra-red signal.

In this way, it is possible to label a plurality of control units 10 with the same or different addresses.

Once all the control units 10 desired to be controlled by the wireless control unit 20, 30, 40, 50 have been labelled with addresses, then the wireless control unit 20, 30, 40, 50 can be used to control only those control units 10 which have been labelled with a particular address in the following manner.

The address switch actuator 22 is adjusted to the position which selects the address of the control units 10 which were desired to be controlled, for example A. After that has been done, any signals sent from wireless control unit 20, 30, 40, 50 in response to the actuation of the other actuators, for example scene select actuation 31, 41, 51 or transmitter selection actuator 33, 43, 53 contain address information A.

Only those control units 10 which have previously been labelled with address A will respond to the infra-red signals which contain address information A. Other control units 10 will not respond. In this way, by labelling a plurality of control units 10 with different addresses, it is possible to control each control unit 10 individually, even if all units receive the infra-red signals.

It is also possible for the address switch actuator 22 to select an ALL address. This cannot be used to label control units 10. However, once the control units 10 have been labelled with individual addresses A, B, C, etc., then selecting the ALL address with the address switch actuator 22 causes the infra-red signals transmitted from wireless control unit 20, 30, 40, 50 to contain an ALL address. In this case, all control units 10 which receive the infra-red signals with the ALL address will respond regardless of the individual addresses with which they have been labelled.

Turning to FIG. 10, the circuitry of the power control unit 10 is depicted in the control unit block diagram 100. The circuitry, with the exception of wireless remote control operation, is well known to one skilled in the art, and is fully described in U.S. Pat. No. 5,248,919 which has been incorporated herein by reference. Therefore, a detailed description of the prior art circuit is not reproduced herein, and only the new features of the present invention are described below.

The preferred embodiment of the present invention provides the features of wireless remote control operation, as described below, in combination with the light control disclosed in U.S. Pat. No. 5,248,919. In the preferred embodiment of the present invention, the circuitry of the power control unit 10 is commanded by infra-red control signals transmitted by wireless remote control units 20, 30, 40, 50, (shown in FIGS. 2, 3, 4 and 5, respectively) in addition to being commanded by actuators located on the power control unit 10. An infrared receiver 104 responds to the infra-red control signals and converts them to electrical control signal inputs to a microprocessor 108 in a similar manner to which the signal detector 102 responds to control signals from switches 110 located in power control unit 10 as well as control signals from switches 111 within wired remote lighting control units and provides control signal inputs to microprocessor 108 of the present invention are similar to the control signals, signal detector 32, and microprocessor 28 disclosed in U.S. Pat. No. 5,248,919. However, the program running is different and provides additional functions and features not disclosed in U.S. Pat. No. 5,248,919.

In the present invention, control signal inputs are generated by switch actuators on the power control unit 10, by switch actuators on a user actuatable wireless remote control unit 20, 30, 40, 50, or on wired remote lighting control units. In each case, these signals are directed to the microprocessor 108 for processing. The microprocessor 108 then sends the appropriate signals on to the remaining portion of the control circuitry which in turn control the intensity levels and state of the lamp 114 associated with the control unit 10.

A block diagram of the control circuit 200 of basic remote control unit 20 is depicted in FIG. 11. The intensity selection actuator 23 actuates intensity selection switches 223*a* or 223*b* and the control switch actuator 21 actuates transmitter control switch 221 to provide inputs to a microprocessor 27. The microprocessor 27 provides encoded control signals to an LED drive circuit 28, which drives an LED 26 to produce and transmit infrared signals encoded by the microprocessor 27. The LED 26 is located in the IR transmitter opening 25, embodied in the end wall 24 of the user actuatable basic remote control unit 20.

The address switch actuator 22 actuates the address switch 222 to provide inputs to the microprocessor 27. A "SEND ADDRESS" switch not shown in FIG. 11 would also provide input to the microprocessor 27 as described above.

Battery 49 provides power to basic remote control unit 20.

The microprocessor 27 has a preprogrammed software routine which controls its operation. The operation of the routines in the microprocessor 27 is illustrated in flow chart form in FIG. 6. There is one major flow path, or routine, which the program in the microprocessor 27 follows. This path is selected whenever the "ACTUATOR OR ACTUATORS OPERATED?" decision node 2000 is "yes". This occurs whenever the control switch actuator 21 or the power level selection actuator 23 is actuated. Following the "ACTUATOR OR ACTUATORS OPERATED?" decision node is the "DETERMINE WHICH ACTUATOR OR ACTUATORS WERE OPERATED?" node 2004 where a determination is made as to which actuator or actuators were operated. Following the "DETERMINE WHICH ACTUATOR OR ACTUATORS WERE OPERATED" node 2004 is the "DETERMINE ADDRESS" node 2006, where the microprocessor 27 determines the setting of the address switch 222. The microprocessor 27 then proceeds to "LOOK UP A NUMBER WHICH CORRESPONDS TO THE ACTUATOR OR ACTUATORS OPERATED AND THE ADDRESS SELECTED" 2008. The microprocessor then "ENCODES NUMBER" 2010 and then "TRANSMITS CODE" 2012.

If the control switch actuator 21 or power level selection actuator 23 is not actuated by a user, the remote control unit 20 enters a "SLEEP MODE" 2002 and no change is made to the state of the control unit 10.

A block diagram of each of the control circuits 300, 400, 500 of the enhanced wireless remote control units 30, 40, 50 is depicted in FIGS. 12A, 12B, 12C. These block diagrams are very similar to the block diagram 200 shown in FIG. 11 with the scene control switches 331*a*, 331*b* in the block diagram 300 replacing the transmitter control switch 221 in the block diagram 200, the scene control switches 441*a*, 441*b*, 441*c*, 441*d*, 441*e* in the block diagram 400 replacing the transmitter control switch 221 in the block diagram 200, and the scene control switches 551*a*, 551*b*, 551*c*, 551*d*, 551*e*, and special function switches 551*f*, 551*g*, 551*h*, 551*i* in the block diagram 500 replacing the transmitter control switch 221 in the block diagram 200.

The scene control switches provide inputs to the microprocessor 47. The microprocessor 47 provides encoded control signals to an LED drive circuit 48 which drives an LED 36, 46, 56 to produce and transmit infrared signals encoded by the microprocessor 47. These signals are transmitted through the IR opening 35, 45, 55 which is located in the end wall 34, 44, 54 of the enhanced wireless remote control units 30, 40, 50.

An address switch actuator 22 of the enhanced remote control units 30, 40, 50 actuates the address switch 332, 442, 552 respectively to provide inputs to the microprocessor 47. A send address switch, not shown in FIGS. 12A, 12B, and 12C would also provide input to the microprocessor 47.

Figure 6:
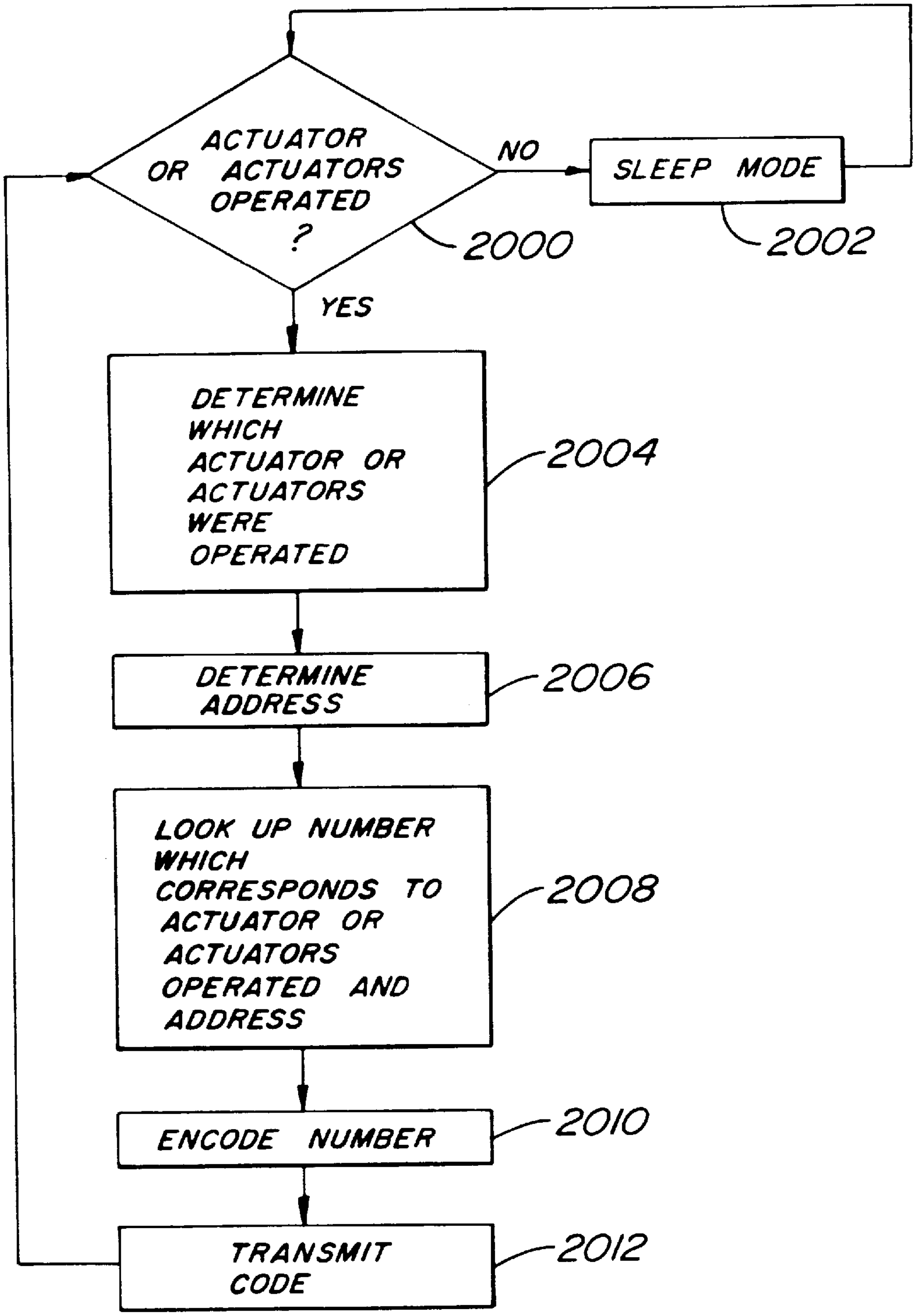
FIG. 6 shows a functional flow diagram of the operation of the transmitter units.

The enhanced remote control units 30, 40, 50 use the same preprogrammed software routine to control their operation as depicted in FIG. 6. The actual code running may be different. The "ACTUATOR OR ACTUATORS OPERATED" decision node 2000 in FIG. 6 is "yes" whenever a scene control switch or a power level intensity selector switch is actuated.

Figure 13:
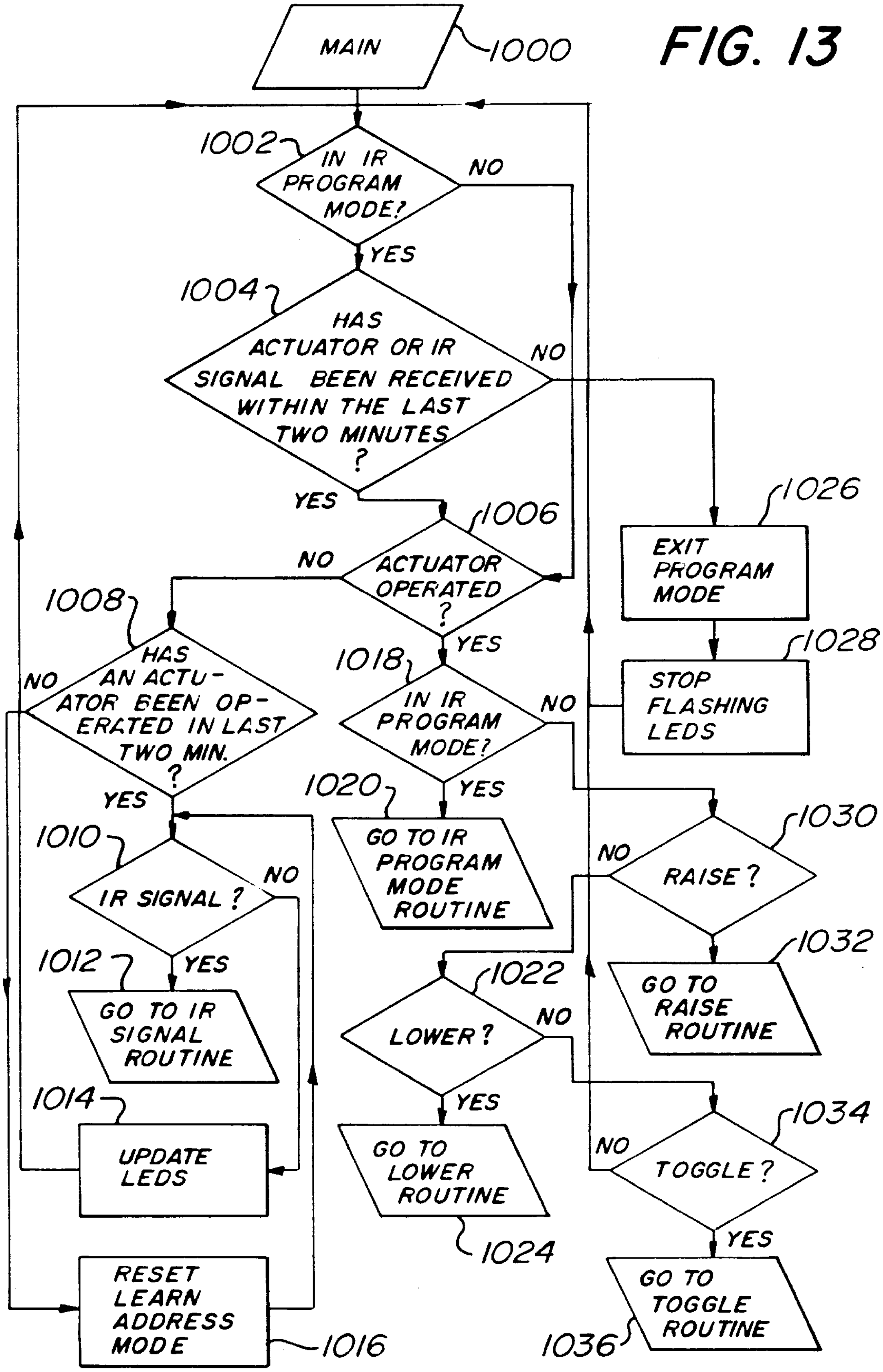
FIGS. 13–20 show a functional flow diagram of the operation of the receiver unit.

Turning to FIGS. 13 through 20, the microprocessor 108 of the control unit 10 has preprogrammed software routines which control its operation. The operation of the routines in the microprocessor 108 is illustrated in flow chart form in FIG. 13 through 20. Referring to FIG. 13, there are four major flow paths, or routines, which the microprocessor 108 can follow. These paths are selected depending on the source of the input control signals. The first three paths, RAISE 1030, LOWER 1024, and TOGGLE 1036 are selected when the power selection actuator 12 or the control switch actuator 13 are actuated, as discussed above.

The function of the preprogrammed software routines for the operation by wireless remote control will also be discussed in detail, this is the fourth path, "IR SIGNAL" 1012.

Referring to FIG. 13, the program begins at "MAIN" 1000 as shown. The first decision node encountered is the "IN IR PROGRAM MODE?" 1002. The program determines if the control unit 10 is in program mode so that preprogrammed light intensities can be stored. If the output from "IN IR PROGRAM MODE" decision node 1002 is "yes", the next decision node is "HAS AN ACTUATOR OR IR SIGNAL BEEN RECEIVED WITHIN THE LAST TWO MINUTES?" 1004. Decision node 1004 performs a time out function to determine if the user is confused while in programming mode. If the user does not touch the actuators on the control unit within two minutes, the unit will automatically exit from program mode and stop flashing indicators 14 that are being flashed. If the output from decision node 1004 is "no", the control unit 10 is commanded to "EXIT PROGRAM MODE" 1026 and "STOP FLASHING LEDS" 1028 and the program returns to "MAIN" 1000. If the output from decision node 1004 is "yes", the program proceeds to the "ACTUATOR OPERATED?" decision node 1006. A check is made as to whether any actuators have been actuated on the control unit 10 i.e., the power level selection actuator 12 or the control switch actuator 13.

If the output of the "ACTUATOR OPERATED?" decision node 1006 is "yes", the program proceeds to "IN IR PROGRAM MODE?" decision node 1018, where a check is made as to whether the control unit 10 is in program mode again. If the output of the "IN IR PROGRAM MODE?" decision node 1018 is "yes", the program proceeds to "GO TO IR PROGRAM MODE ROUTINE" 1020. This is shown in greater detail in the IR Program Mode routine 1100, shown in FIG. 14.

If the output from decision node 1018 is "no", the program proceeds to the "RAISE?" decision node 1030 where a check is made as to whether the upper power level selector portion 12*a* has been actuated. If the output from the "RAISE" decision node is "yes", the program proceeds to the "GO TO RAISE ROUTINE" 1032. The "RAISE" routine 1400 is shown in greater detail in FIG. 16.

If the output of the "RAISE" decision node 1030 is "no", the program proceeds to the "LOWER?" decision node 1022 where a check is made as to whether the lower power level selector portion 12*b* has been actuated. If the output from the "LOWER" decision node 1022 is "yes", the program proceeds to the "GO TO LOWER ROUTINE" 1024. The "LOWER" routine 1200 is shown in greater detail in FIG. 15.

If the output from the "LOWER?" decision node 1022 is "no", the program proceeds to the "TOGGLE?" decision node 1034 where a check is made as to whether the control switch actuator 13 has been actuated. If the output of the "TOGGLE" decision node 1034 is "yes", the program proceeds to the "GO TO TOGGLE ROUTINE" 1036. The "TOGGLE" routine 1300 is shown in greater detail in FIG. 17. If the output of the "TOGGLE" node 1034 is "no", the program then returns to "MAIN" 1000.

If the output of the "ACTUATOR OPERATED?" decision node 1006 is "no", the program proceeds to the "HAS AN ACTUATOR BEEN OPERATED IN THE LAST TWO MINUTES?" decision node 1008. The decision node 1008 runs another time out check to determine if any control actuators have been operated in the last two minutes. If the output from the decision node 1008 is "yes", the program proceeds to the "IR SIGNAL?" decision node 1010 where a determination is made as to whether an IR signal has been received. If the output of the "IR SIGNAL?" decision node 1010 is "yes", the program proceeds to "GO TO IR SIGNAL ROUTINE" 1012. The "IR SIGNAL ROUTINE" 1500 is shown in greater detail in FIGS. 18, 19, 20. If the output of the "IR SIGNAL?" decision node 1010 is "no", the program proceeds to "UPDATE LEDS" 1014 where the status of the intensity indicators 14 are updated, and the program returns to "MAIN" 1000. The control unit 10 is constantly updating the LED display even if no actuators are actuated or if no IR signals are received. If the "HAS AN ACTUATOR BEEN OPERATED IN THE LAST TWO MINUTES?" decision node 1008 is "no", the program proceeds to "RESET LEARN ADDRESS MODE" 1016 and then proceeds on to the "IR SIGNAL?" decision node 1010.

After the program proceeds to the "LEARN ADDRESS MODE?" 1590, which will be described in more detail below, and "SAVE NEW ADDRESS" 1580, the program is looking for a confirmation signal. If the control unit does not receive the confirmation signal within two minutes the "LEARN ADDRESS MODE" is reset and the new address received is erased.

Figure 14:
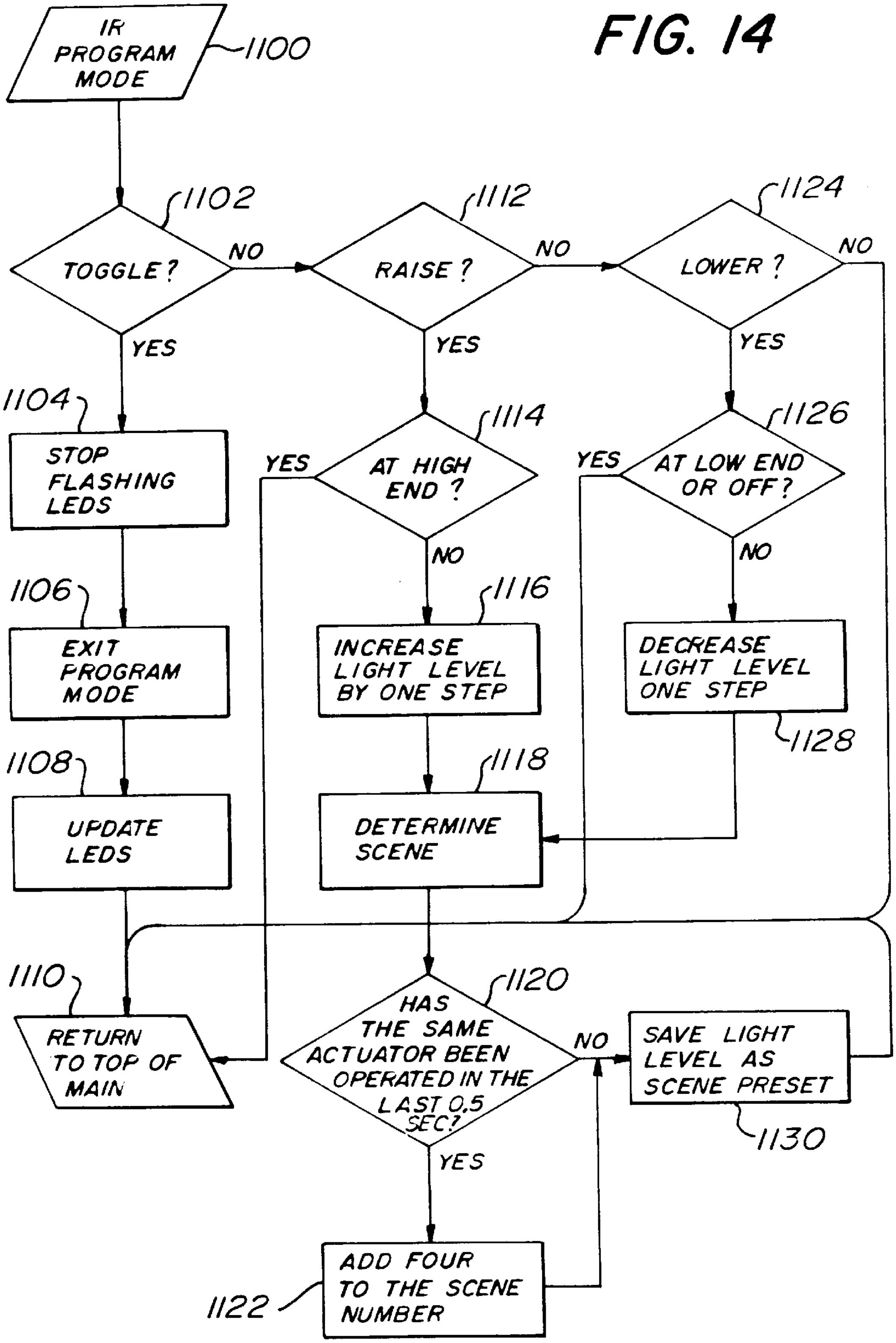

Turning now to FIG. 14, the first decision node encountered in "IR PROGRAM MODE" is "TOGGLE?" 1102. IR program mode is where preset light intensity levels can be stored in the control unit 10 by actuating actuators on the control unit 10 or on an enhanced wireless transmitter 30, 40, 50. At the "TOGGLE" decision mode 1102 a determination is made as to whether the control switch actuator 13 has been actuated. If the output of the node is "yes", the control unit 10 is commanded to "STOP FLASHING LEDS" 1104 where any flashing indicators 14 are extinguished. The program continues to "EXIT PROGRAM MODE" 1106, and "UPDATE LEDS" 1108 where the indicators 14 are updated to the correct status, and the program proceeds to "RETURN TO TOP OF MAIN" 1110. This is one way of exiting program mode. Another way will be described in detail below.

If the output of "TOGGLE?" decision node 1102 is "no", the next decision node is "RAISE?" 1112 where a determination is made as to whether the upper power level selector portion 12*a* has been actuated. If the output of the node is "yes", the program moves on to the "AT HIGH END?" decision node 1114. If the output of the "AT HIGH END?" decision node 1114 is "yes", the light intensity of the lamp 114 can not be increased any more, so no changes are made and the program proceeds "RETURN TO TOP OF MAIN" 1110. If the output of the "AT HIGH END?" decision node 1114 is "no", the control unit 10, is commanded to "INCREASE LIGHT LEVEL BY ONE STEP" 1116 where the output power of the control unit 10 is increased. The program continues to "DETERMINE SCENE" 1118 where the program checks which scene is being programmed.

The unit then encounters the "HAS THE SAME ACTUATOR BEEN OPERATED IN THE LAST 0.5 SEC?" decision node 1120. This decision node function is included so that by actuating actuators multiple times, additional functions can be accessed. If the output of the decision node 1120 is "no", the unit is commanded to "SAVE LIGHT LEVEL AS SCENE PRESET" 1130, where a new intensity level is stored for the scene select actuator being programmed.

The program proceeds to "RETURN TO TOP OF MAIN" 1100. If the output of the "HAS THE SAME ACTUATOR BEEN OPERATED IN THE LAST 0.5 SEC?" decision node 1120 is "yes", i.e., multiple actuations of an actuator have occurred within a certain time period, the unit is commanded to "ADD FOUR TO THE SCENE NUMBER" 1122, and "SAVE LIGHT LEVEL AS SCENE PRESET" 1130 and the program proceeds to "RETURN TO TOP OF MAIN" 1000.

If the output of the "TOGGLE?" decision node 1102 is "no" and the output of "RAISE?" decision node 1112 is "no", the program moves to the next major routine and enters the "LOWER?" decision node 1124. A determination is made as to whether the lower power level selector portion 12*b* has been actuated. If the output from decision node 1124 is "no", no changes are made and the program proceeds to "RETURN TO TOP OF MAIN" 1110.

If the output of decision node 1124 is "yes", the program proceeds to the "AT LOW END OR OFF?" decision node 1126. A determination is made as to whether the lamp 114 is at minimum light intensity or off. If the output from decision node 1120 is "yes", the light intensity can not be decreased further, no changes are made and the program proceeds to "RETURN TO TOP OF MAIN" 1110. If the output from decision node 1126 is "no", the control unit 10 is commanded to "DECREASE LIGHT LEVEL BY ONE STEP" 1128 where the output power of the control unit 10 is decreased and "DETERMINE SCENE" 1118 where once again the unit checks which scene is being programmed.

The program proceeds on to "HAS THE SAME ACTUATOR BEEN OPERATED IN THE LAST 0.5 SEC?" decision node 1120. If the output from decision node 1120 is "no", the unit is commanded to "SAVE LIGHT LEVEL AS SCENE PRESET" 1130, where the new intensity is stored for the scene select actuator being programmed. The program proceeds to "RETURN TO TOP OF MAIN" 1110. If the output of "HAS THE SAME ACTUATOR BEEN OPERATED IN THE LAST 0.5 SEC?" decision node 1120 is "yes", the unit is commanded to "ADD FOUR TO THE SCENE NUMBER" 1122, and "SAVE LIGHT LEVEL AS SCENE PRESET" 1130, and then program proceeds to "RETURN TO TOP OF MAIN" 1110.

Figure 15:
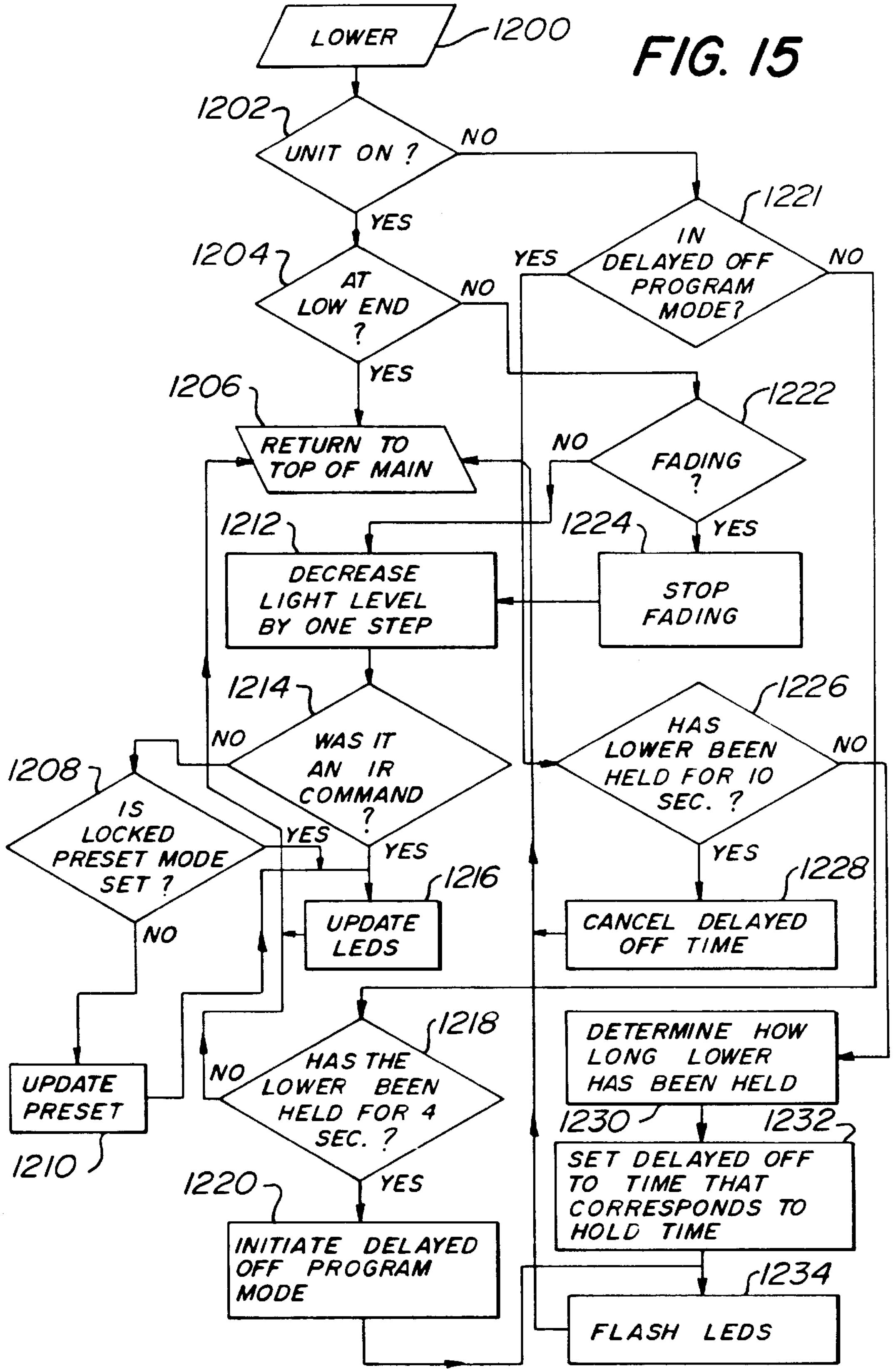

Turning now to FIG. 15 and the "LOWER" routine 1200, the first decision node encountered is "UNIT ON?" 1202 where a determination is made as to whether the control unit 10 is in the "ON STATE". If the output from the "UNIT ON?" decision node 1202 is "yes", the program proceeds to the "AT LOW END?" decision node 1204 where a determination is made as to whether the lamp 114 is at a minimum light intensity. If the output from the decision node 1204 is "yes", the light intensity can not be decreased any more, no changes are made and the program proceeds to "RETURN TO TOP OF MAIN" 1206. If the output of the "AT LOW END?" decision node 1204 is "no", the program proceeds to the "FADING" decision node 1222. A determination is made as to whether the control unit 10 is in a steady state, or is fading between two different output light intensity levels. If the output from decision node 1222 is "yes", the control unit 10 is fading between two different light intensity levels hence the control unit 10 is commanded to "STOP FADING" 1224 and to "DECREASE LIGHT LEVEL BY ONE STEP" 1212, and the output power of control unit 10 is decreased. The next decision node encountered is the "WAS IT AN IR COMMAND?" 1214.

If the output of the "FADING" decision node 1222 is "no", then the power output from control unit 10 is in a steady state, and the control unit 10 is commanded to "DECREASE LIGHT LEVEL BY ONE STEP" 1212 and the output power of control unit 10 is decreased. The program then proceeds to the "WAS IT AN IR COMMAND?" decision node 1214 where a determination is made as to whether an infra-red signal has been received which caused the program to enter the "LOWER" routine 1200.

If the output from the "WAS IT AN IR COMMAND?" decision node 1214" is "yes", the program proceeds to "UPDATE LEDS" 1216, and then "RETURN TO TOP OF MAIN" 1206. No change is made to any stored preset levels because LOWER commands from the wireless transmitter only affect the current light intensity unless the control unit 10 is in program mode. Further as described below any light intensity levels adjusted by using the user actuatable intensity selection actuator on the control unit 10 are temporary if the locked preset mode is set and are stored if the locked preset mode is not set.

If the output of the "WAS IT AN IR COMMAND?" decision node 1214 is "no", the program proceeds to the "IS LOCKED PRESET MODE SET?" decision node 1208 where a determination is made as to whether a preset light intensity has been stored. If the output from decision node 1208 is "no" and no locked preset has been stored the unit is commanded to "UPDATE PRESET" 1210 where the memory which stores the current value of the unlocked preset has the new intensity level stored in it. The program goes on to "UPDATE LEDS" 1212 where the status of the intensity indicators 14 is updated, and the program proceeds to "RETURN TO TOP OF MAIN" 1206. If the output of the "IS LOCKED PRESET MODE SET?" decision node 1208 is "yes", the unit is commanded to "UPDATE LEDS" 1216, and then "RETURN TO TOP OF MAIN" 1206. No change is made to any stored preset intensity levels.

If the output from of the "UNIT ON?" decision node 1202 is "no", the unit proceeds to the "IN DELAYED OFF PROGRAM MODE?" decision node 1221. A delayed off time can be permanently stored so that every time the user actuates an actuator which causes the control unit 10 to turn off, the unit delays a certain amount of time before turning off. If the control unit 10 is in the mode where a delay to off time is being programmed then the output from decision node 1221 is "yes", and the program proceeds to the "HAS THE LOWER ACTUATOR BEEN HELD FOR 10.0 SEC?" decision node 1226.

The permanently stored delay to off time can be cleared by actuating an actuator which causes a "LOWER" 1200 command for an extended period of time, i.e., 10 seconds. If the output from decision node 1226 is "yes", the unit is commanded to "CANCEL DELAYED OFF TIME" 1228, and the program proceeds to "RETURN TO TOP OF MAIN" 1206. If the output from "HAS THE LOWER ACTUATOR BEEN HELD FOR 10.0 SEC?" decision node 1226 is "no", the program proceeds to the"DETERMINE HOW LONG LOWER ACTUATOR HAS BEEN HELD" node 1230 where a determination is made as to how long a "LOWER" 1200 commanding actuator has been actuated. The program continues to "SET DELAYED OFF TO TIME THAT CORRESPONDS TO HOLD TIME" 1232 where the appropriate delay time is stored. The program continues to "FLASH LEDS" 1234 where the indicators are flashed as described above. The program proceeds to "RETURN TO TOP OF MAIN" 1206. The longer the user depresses the "LOWER" commanding actuator, the longer the delayed off time which is stored.

If the output from the "IN DELAYED OFF PROGRAM MODE?" decision node 1221 is "no", the unit proceeds to the "HAS THE LOWER BEEN HELD FOR 4.0 SEC?" decision node 1218. To permanently store a delayed off time, the user actuates an actuator which causes a "LOWER" command for an extended period of time, i.e., 4 seconds. If the decision node 1218 is "no", the program proceeds to "RETURN TO TOP OF MAIN" 1206.

If the output from decision node 1218 is "yes", the control unit is commanded to "INITIATE DELAYED OFF PROGRAM MODE" 1220, to flash the lowermost indicator 14 as described above, and then "FLASH LEDS" 1234, and then the program proceeds to "RETURN TO TOP OF MAIN" 1206.

Figure 16:
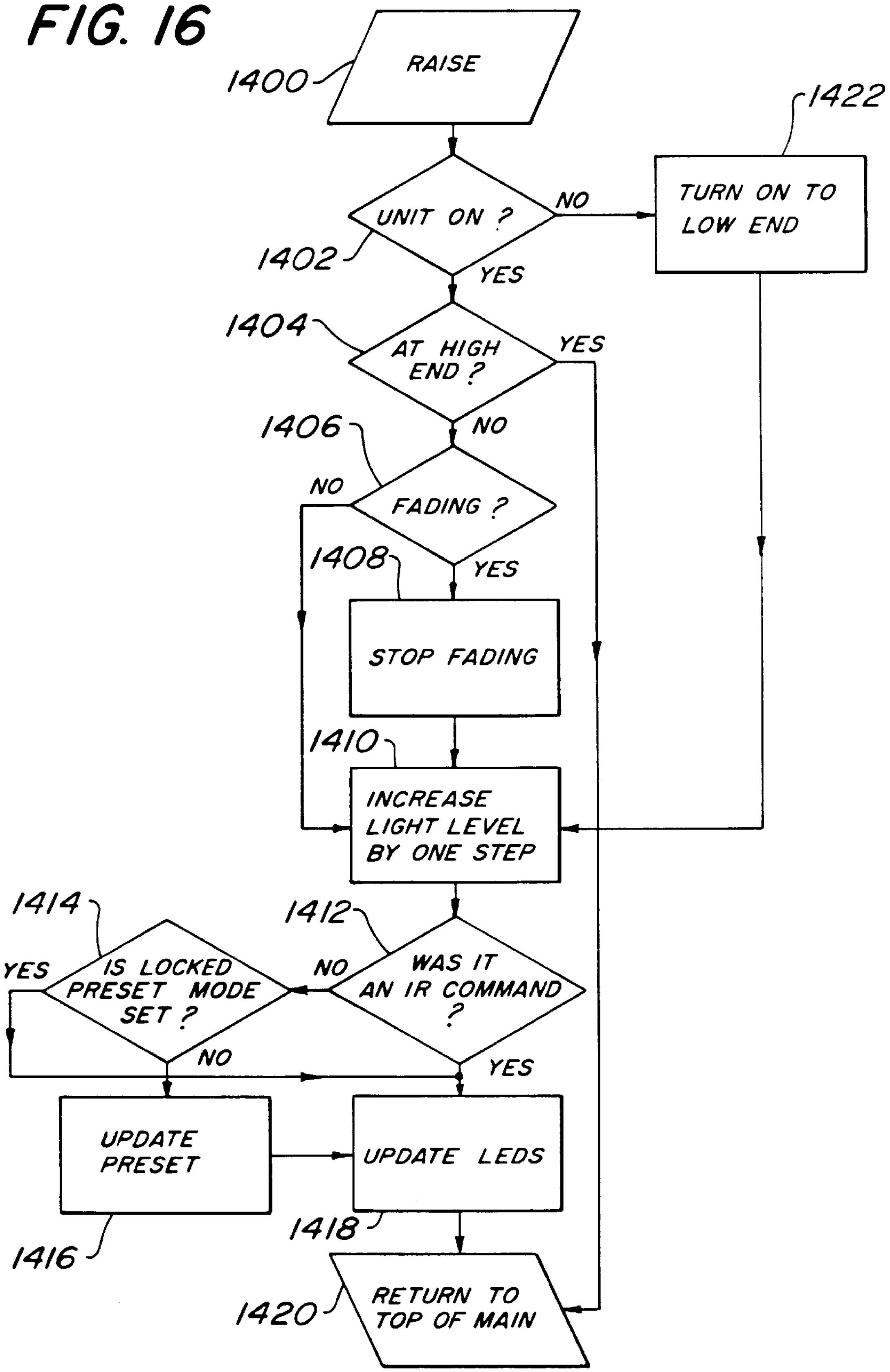

Turning now to FIG. 16, in the "RAISE" routine 1400, the first decision node encountered is a "UNIT ON?" decision node 1402, where a determination is made as to whether the control unit 10 is in the on state. If the output from the "UNIT ON?" decision node 1402 is "yes", i.e., the control unit 10 is on the program moves to the "AT HIGH END?" decision node 1404 where a determination is made as to whether the lamp 114 is at a maximum light intensity.

If the output from decision node 1404 is “yes”, the light intensity cannot be increased any more, so no changes are made and the program proceeds to “RETURN TO TOP OF MAIN” 1420. If the output from decision node 1404 is “no”, the routine proceeds to the “FADING?” decision node 1406 where a determination is made as to whether the control unit 10 is in a steady state or is fading between two different output light intensity levels. If the output from decision node 1406 is “yes”, the control unit 10 is fading between two different light intensity levels, hence the control unit 10 is commanded to “STOP FADING” 1408 and then to “INCREASE LIGHT LEVEL BY ONE STEP” 1410 where the output power of the control unit 10 is increased. If the output from “FADING” decision node 1406 is “no”, the unit is commanded to “INCREASE LIGHT LEVEL BY ONE STEP” 1410 where the output power of the control unit 10 is increased. The program then proceeds to the “WAS IT AN IR COMMAND?” decision node 1412 where a determination is made as to whether an infra-red signal has been received which caused the program to enter the RAISE routine 1400. If the output from decision node 1412 is “yes”, the control unit 10 proceeds to “UPDATE LEDS” 1418 and then the program proceeds to “RETURN TO TOP OF MAIN” 1420 . No change is made to any stored preset levels because RAISE 1400 routine commands from the wireless transmitter only affect the current light levels unless the control unit 10 is in program mode. If the output from the “WAS IT AN IR COMMAND?” decision node 1412 is “no”, the program then proceeds to the “IS LOCKED PRESET MODE SET?” decision node 1414 where a determination is made as to whether a locked preset light intensity level has been stored. If the output from decision node 1414 is “yes”, the control unit 10, proceeds to “UPDATE LEDS” 1418 where the status of intensity indicator 14 is updated and then the program proceeds to RETURN TO TOP OF MAIN 1420. If the output from decision node 1414 is “no”, the unit is commanded to “UPDATE PRESET” 1416 where the memory (not shown) which stores the current value of the unlocked preset has the new intensity level stored in the memory, and then goes on to “UPDATE LEDS” 1418. If the output from “UNIT ON?” decision node 1402 is “no”, the control unit 10 is commanded to “TURN ON TO LOW END” 1422 where the control unit 10 is turned on, the program goes on to, “INCREASE LIGHT LEVEL BY ONE STEP” 1410 and then to “WAS IT AN IR COMMAND?” decision node 1412.

Figure 17:
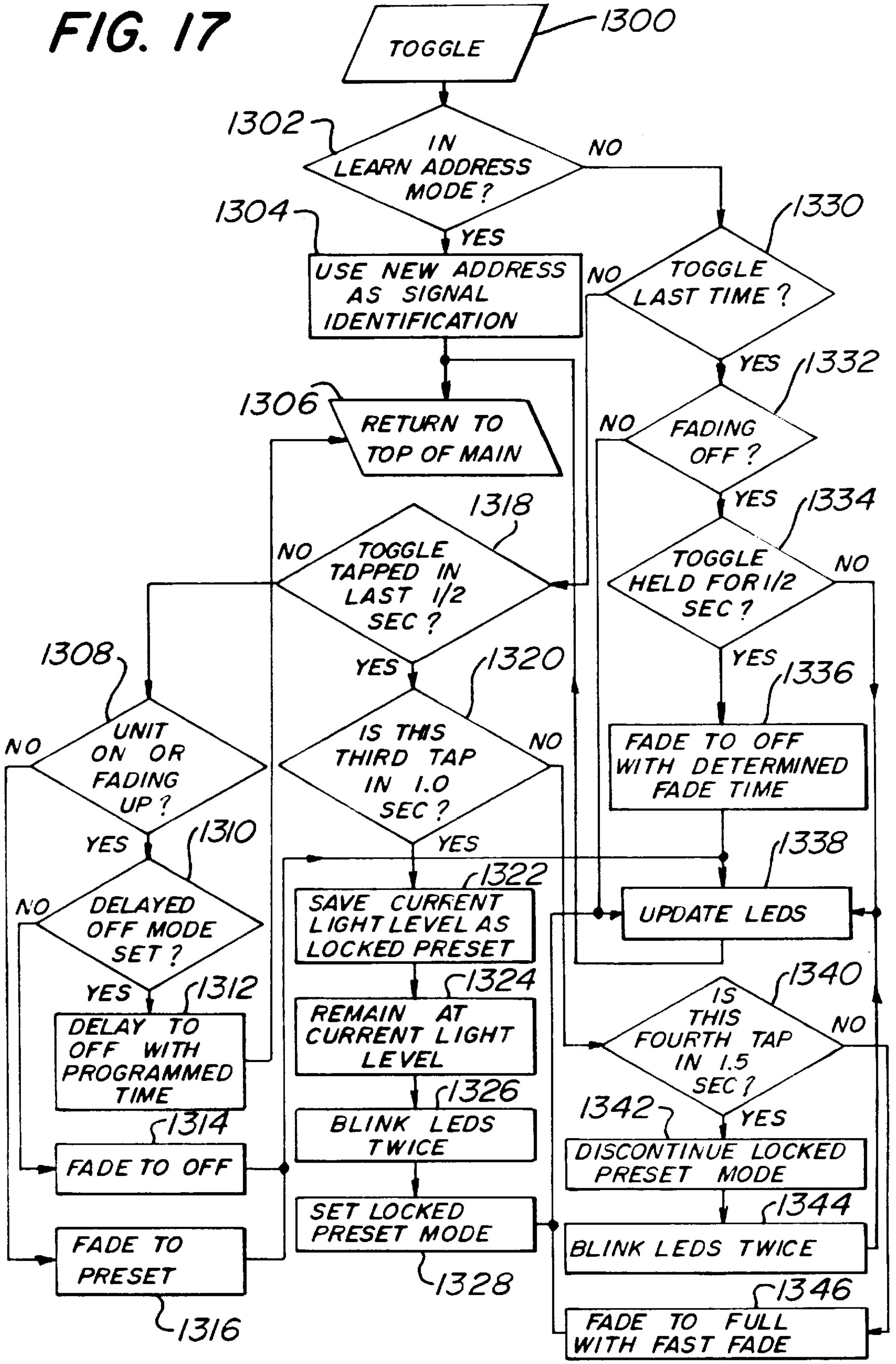

Turning now to FIG. 17 and the “TOGGLE” routine 1300, the first decision node encountered is “IN LEARN ADDRESS MODE?” 1302 where a determination is made as to whether the control unit 10 is in a mode where it is being labelled with a new address. If the determination is made by the microprocessor 108 that the control unit 10 is being labelled with a new address then the output from decision node 1302 is “yes”, and the microprocessor proceeds to “USE NEW ADDRESS AS SIGNAL IDENTIFICATION” 1304 commanding the control unit 10 to store the new address received as its unit address, then “RETURN TO TOP OF MAIN” 1306. As described above, the control unit 10 is capable of receiving a unique addresses via IR signals. This enables the use of a transmitter that has an address selector switch to control a plurality of control units 10 individually. If the output of the “IN LEARN ADDRESS MODE?” decision node 1302 is “no”, the program proceeds to the “TOGGLE LAST TIME?” decision node 1330 where a determination is made as to whether control switch actuator 13 is being actuated for more than a transitory period of time. If the output from decision node 1330 is “yes”, the program proceeds to the “FADING OFF?” decision node 1332 where a determination is made as to whether the power level at the output of the control unit 10 is decreasing. If the output of the decision node 1332 is “yes”, and the power output is decreasing the program proceeds to the “TOGGLE HELD FOR ½ SECOND?” decision node 1334 where a determination is made as to whether the control switch actuator 13 has been actuated for more than ½ second and if so, for how long. If the output of the node is “yes”, the control unit 10 is commanded to “DELAY TO OFF WITH DETERMINED DELAY TIME” 1336 where the control unit 10 outputs its current power level for the duration of the delay time corresponding to the length of time the control switch actuator 13 has been actuated, and then decreases the output power level and hence, the light intensity of lamp 114 to zero. The program proceeds to “UPDATE LEDS” 1338 where the indicator 14, indicating the current intensity level is flashed during the delay time and successively lower indicators are illuminated in turn as the output power level from the control unit 10 is decreased, and then proceeds to “RETURN TO TOP OF MAIN” 1306.

If the output from “TOGGLE LAST TIME?” decision node 1330 is “no”, and the control switch actuator 13 is not being actuated for more than a transitory, period of time the program proceeds to the “TOGGLE TAPPED IN LAST 0.5 SEC?” decision node 1318, where a determination is made as to whether control switch actuator 13 was previously actuated in a transitory manner in the last 0.5 sec. If the output from decision node 1318 is “yes”, the program proceeds to the “IS THIS THE THIRD TAP IN 1.0 SECONDS?” decision node 1320 where a determination is made as to whether this is the third actuation of transitory duration in 1.0 sec. If the output from decision node 1320 is “yes”, the control unit 10 is commanded to “SAVE THE CURRENT LIGHT LEVEL AS LOCKED PRESET” 1322, wherein the current light intensity level is stored in memory as the LOCKED PRESET light level. The program continues to “REMAIN AT CURRENT LIGHT LEVEL” 1324, the current light intensity level is not changed and then the program proceeds to “BLINK LEDs TWICE” 1326. The indicator 14 indicating the current intensity level is flashed twice at a frequency of 2 Hz to indicate that the current light level has been stored and the program proceeds to “SET LOCKED PRESET MODE” 1328 where the microprocessor 108 is updated to reflect that it is in the LOCKED PRESET mode. The program proceeds to “UPDATE LEDS” 1338 where the indicator 14 indicating the current intensity level is illuminated.

If the output from the “IS THIS THE THIRD TAP IN 1.0 SECONDS?” decision node 1320 is “no”, the program proceeds to the “IS THIS THE FOURTH TAP IN 1.5 SECONDS?” decision node 1340 where a determination is made as to whether this is the fourth actuation of transitory duration in 1.5 SEC. If the output from decision node 1340 is “no”, then it must be the second actuation of transitory duration and the control unit 10 proceeds to “FADE TO FULL WITH FAST FADE” 1346. The light intensity of lamp 114 is increased rapidly to a maximum light intensity, and the program proceeds to “UPDATE LEDS” 1338 where successively higher level indicators are illuminated in turn as the light intensity of lamp 114 increases.

If the output from decision node 1340 is “yes”, then this is the fourth actuation of transitory duration in 1.5 sec. The program proceeds to “DISCONTINUE LOCKED PRESET” 1342 where microprocessor 108 is updated to remove the control unit 10 from the LOCKED PRESET mode. The program proceeds to, “BLINK LEDS TWICE” 1344 where the indicator indicating the current intensity level is flashed twice at a frequency of 2 Hz and then "UPDATE LEDS" 1338 where the indicator 14 indicating the current intensity level is illuminated.

If the output from "TOGGLE TAPPED IN THE LAST ½ SECOND?" decision node 1318 is "no", the program proceeds to the "UNIT ON OR FADING UP?" node 1308 where a determination is made as to whether the control unit 10 is in the on state, or fading between two intensity levels. If the output from decision node 1308 is "yes", the program proceeds to "DELAYED OFF MODE SET?" decision node 1310. If the output from decision node 1310 is "yes", and a predetermined delay to off time has been stored (see description of set delay routine 1232 in FIG. 15), the control unit 10 is commanded to "DELAY TO OFF WITH PROGRAMMED TIME" 1312. The lamp 114 stays at its current intensity level for the stored delay to off time, and then the intensity of lamp 114 decreases to zero. The program proceeds to "RETURN TO TOP OF MAIN" 1306. If the output from "DELAYED OFF MODE SET?" decision node 1310 is "no", the control unit 10 is commanded to "FADE TO OFF" 1314 and the light intensity of lamp 114 is decreased to zero then the program proceeds to "UPDATE LEDS" 1338 when successively lower indicators are illuminated in turn as the light intensity of lamp 114 is decreased.

If the output of the "UNIT ON OR FADING UP?" decision node 1308 is "no", the control unit 10 is commanded to "FADE TO PRESET" 1316 where the light intensity of lamp 114 is increased to a preset level. The preset level can be the locked preset level, or the last preset level when the control unit 10 was in the on state. The program proceeds to "UPDATE LEDS" 1338 where successively higher indicators 14 are illuminated in turn as the light intensity of lamp 114 increases.

If the output from the "FADING OFF?" decision node 1332 is "no", the program proceeds to "UPDATE LEDS" 1338 where the status of indicators 14 is updated. If the output of "TOGGLE HELD FOR ½ SECOND?" decision node 1334 is "no", the program proceeds to "UPDATE LEDS" 1338, and the status of indicators 14 is updated.

Figure 18:
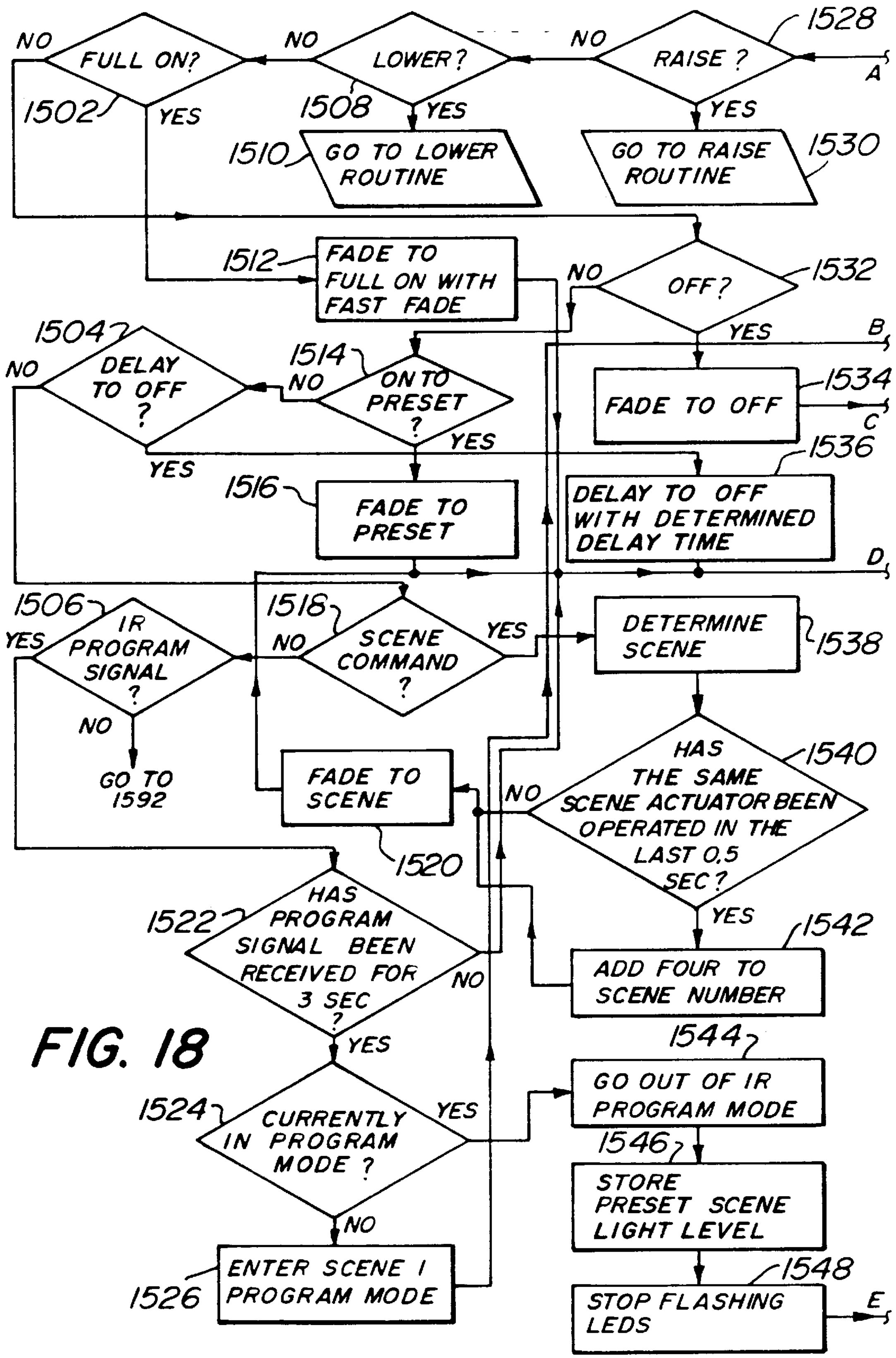
Figure 19:
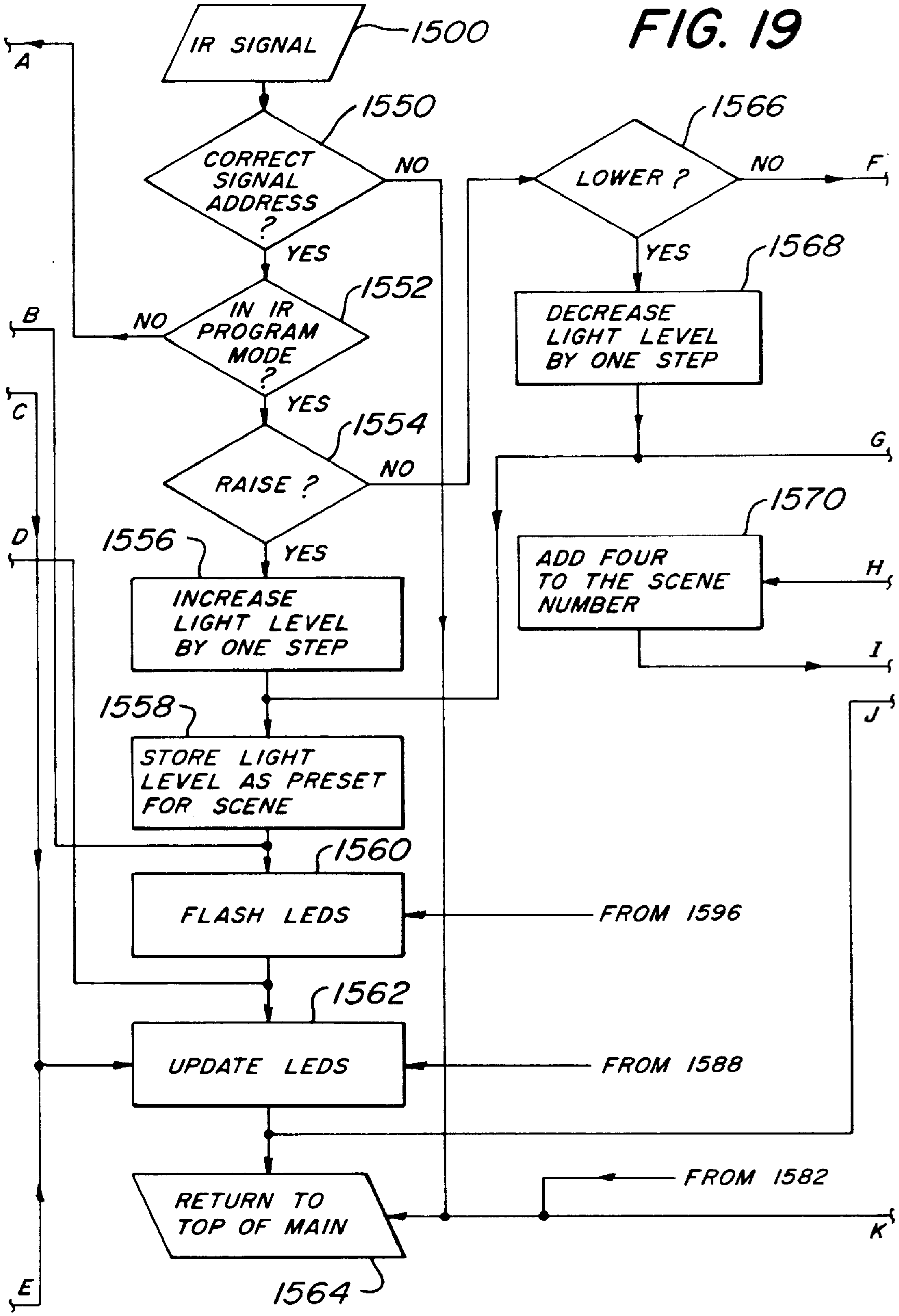
Figure 20:
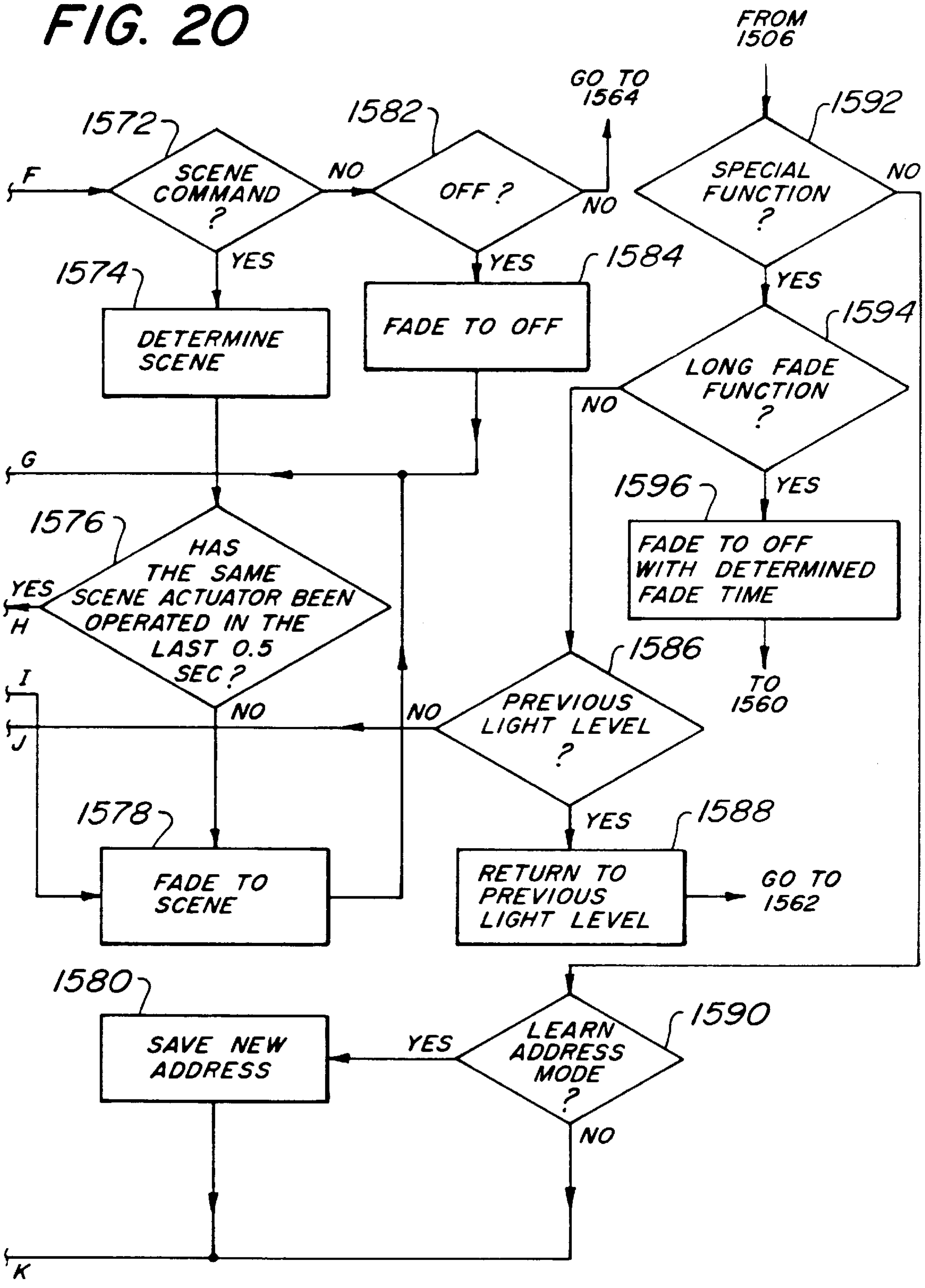

Turning now to FIGS. 18, 19, AND 20 and the "IR SIGNAL" routine 1500, starting with the "CORRECT SIGNAL ADDRESS?" decision node 1550, the control unit 10 determines whether it should respond to IR signals received by first checking to see if the IR signal address matches the unit address. If the addresses do not match the control unit 10 ignores the IR signals. If the output from decision node 1550 is "no", the program proceeds to "RETURN TO TOP OF MAIN" 1564.

If the output from decision node 1550 is "yes", the program proceeds to "IN IR PROGRAM MODE" decision node 1552 where a determination is made as to whether control unit 10 is in the IR PROGRAM MODE. If the output of the node is "no", the program proceeds to a series of decision nodes.

The first decision node encountered is "RAISE?" 1528 where a determination is made as to whether the IR signal indicates that an increase power level actuator 23*a*, 33*a*, has been actuated or a power level selection actuator 43, 53 has been actuated in its up position. If the output from the "RAISE?" decision node 1528 is "yes", the program proceeds to "GO TO RAISE ROUTINE" 1530 which is illustrated in FIG. 16. If the output from decision node 1528 is "no", the program proceeds to the "LOWER?" decision node 1508, where a determination is made as to whether the IR signal indicates that a decrease power level actuator 23*b*, 33*b*, has been actuated or a power level selection actuator 43, 53 has been actuated in its down position. If the output from "LOWER?" decision node 1508 is "yes", the program proceeds to "GO TO LOWER ROUTINE" 1510 which is illustrated in FIG. 15. If the output from "LOWER?" decision node 1508 is "no", the program proceeds to the "FULL ON?" decision node 1502 where a determination is made as to whether the IR signal indicates that two transitory actuations of a transmitter switch actuator 21 as shown in FIG. 2 have occurred in a short period of time. If the output from decision node 1502 is "yes", the control unit 10 is commanded to "FADE TO FULL ON WITH FAST FADE" 1512 this will cause the light intensity of lamp 114 to increase rapidly to maximum and then "UPDATE LEDS" 1562, where successively higher indicator 14 are illuminated in turn as the light intensity of the lamp 14 increases and then the program proceeds to the TOP OF MAIN 1564.

If the output from the "FULL ON?" decision node is 1502 is "no", the program proceeds to the "OFF?" decision node 1532 where a determination is made as to whether the IR signal indicates that an off actuator 31*b*, 41*e*, 51*e* has been actuated or transmitter switch actuator 21 has been actuated and the control unit 10 is in the on state. If the output from decision node 1532 is "yes", the control unit 10 is commanded to "FADE TO OFF" 1534 wherein the light intensity of lamp 114 is decreased to zero and then "UPDATE LEDS" 1562 where successively lower indicators 14 are illuminated in turn as the light intensity of lamp 114 is decreased to zero.

If the output of the "OFF?" decision node 1532 is "no", the program proceeds to the "ON TO PRESET?" decision node 1514 where a determination is made as to whether the IR signal indicates that a single actuation of transitory duration of actuator 21 of the basic transmitter shown in FIG. 2 has occurred and the control unit 10 is in the off state. If the output from decision node 1514 is "yes", the control unit 10 is commanded to "FADE TO PRESET" 1516 wherein the light intensity of lamp 114 is increased from zero to a preset intensity level which is either the locked preset intensity level or an unlocked preset intensity level and then "UPDATE LEDS" 1562 where successively higher indicators 14 are illuminated in turn as the light intensity of lamp 114 is increased until the indicator 14 which indicates the preset intensity level is illuminated.

If the output of the "ON TO PRESET?" decision node 1514 is "no", the program proceeds to the "DELAY TO OFF?" decision node 1504 where a determination is made as to whether the IR signal indicates that a transmitter switch actuator 21, or an off actuator 31, 41*e*, 51*e* as shown in FIGS. 2, 3, 4, and 5 has been actuated for a length of time greater than 0.5 sec. If the output from decision node 1504 is "yes", the control unit 10 is commanded to "DELAY TO OFF WITH DETERMINED DELAY TIME" 1536. The microprocessor 108 determines a delay time from the length of time the actuator 21, 31, 41*e*, 51*e* has been actuated, and the control unit 10 causes the lamp 114 to stay at its current light intensity level for the length of the delay time and then the intensity of lamp 114 decreases to zero. The program then proceeds to "UPDATE LEDS" 1562 wherein the indicator 14 indicating the current light intensity level is flashed on and off during the delay time and then successively lower indicators 14 are illuminated in turn as the light intensity of lamp 114 is decreased to zero.

If the output of the "DELAY TO OFF?" decision node 1504 is "no", the program proceeds to the "SCENE COMMAND?" decision node 1518, where a determination is made as to whether the IR signal indicates that one of scene select actuators 31*a*, 41*a–d*, 51*a–d*, or one of the special function actuators 51*f–i* being used as a scene select actuator on an enhanced wireless transmitter has been actuated. If the output of decision node 1518 is "yes", the program proceeds to "DETERMINE SCENE" 1538 where the particular scene select actuator operated is determined and then the program continues to the "HAS THE SAME SCENE ACTUATOR BEEN OPERATED IN THE LAST 0.5 SEC?" decision node 1540 where a determination is made as to whether the particular scene select actuator actuated has been previously actuated in the last 0.5 sec. If the output from decision node 1540 is "yes", the program proceeds to "ADD FOUR TO THE SCENE NUMBER" 1542, and the higher numbered stored preset intensity level associated with that particular scene select actuator is used. The program then proceeds to "FADE TO SCENE" 1520 wherein the light intensity of lamp 114 is increased or decreased in value until it is equal to the desired stored preset intensity level associated with that scene select actuator, and previously programmed into the control unit 10 from an enhanced wireless transmitter 30,40, 50. The program proceeds to "UPDATE LEDS" 1562 where the indicator 14 indicating the current light intensity is first illuminated and then successively higher or lower indicators or indicated in turn as the light intensity of lamp 114 is changed until the indicator 14 indicating the preset intensity level is illuminated. If the output of the "HAS THE SAME SCENE ACTUATOR BEEN ACTUATOR IN THE LAST 0.5 SECOND?" decision node 1540 is "no", the program proceeds to "FADE TO SCENE" 1520 without adding four to the scene number and then proceeds to "UPDATE LEDS" 1562 with the same effect on the control unit 10 as described immediately above.

If the output of the "SCENE COMMAND?" decision node 1518 is "no", the program proceeds to the "IR PROGRAM SIGNAL?" decision node 1506 where a determination is made as to whether the IR signal indicates that the appropriate combination of actuators has been actuated on an enhanced transmitter 30, 40, 50 to cause the control unit to enter program mode. If the output of decision node 1506 is "yes", the program proceeds to "HAS PROGRAM SIGNAL BEEN RECEIVED FOR THREE SECONDS?" decision node 1522 where a determination is made as to whether the actuator combination has been actuated for 3 seconds. If the output of decision node 1522 is "yes", the program proceeds to the "CURRENTLY IN PROGRAM MODE?" decision node 1524 where a determination is made as to whether the control unit 10 is currently in the program mode. If the output of decision node 1524 is "yes", the program proceeds to "GO OUT OF IR PROGRAM MODE" 1544 where the control unit 10 exits program mode. The program then proceeds to, "STORE PRESET SCENE LIGHT LEVEL" 1546 where the preset intensity level associated with the last actuator being programmed is stored in memory and then the program proceeds to "STOP FLASHING LEDS" 1548 where the indicators 14 which are being cycled on and off in connection with the program mode are extinguished and then the program proceeds to "UPDATE LEDS" 1562 where the intensity of indicators 14 is updated to reflect the new condition of the control unit 10 and then the program returns to the TOP OF MAIN 1564.

If the output of "CURRENTLY IN PROGRAM MODE?" decision node 1524 is "no", the program proceeds to "ENTER SCENE 1 PROGRAM MODE" 1526. The control unit 10 is commanded to enter program mode and accept signals to adjust the preset light intensity stored for the preset recalled by actuating the first select scene actuator 31*a*, 41*a*, 51*a*. The program then proceeds to "FLASH LEDS" 1560. The indicator 14 is cycled on and off as described above in connection with the description of the programming of a preset light intensity from an enhanced remote control transmitter 30, 40, 50 then the program proceeds to "UPDATE LEDS" 1562 where the intensity of indicators 14 is updated to reflect the new condition of the control unit 10. If the output of the "HAS PROGRAM SIGNAL BEEN RECEIVED FOR THREE SECONDS?" decision node 1522 is "no", the program proceeds to "UPDATE LEDS" 1562. If the output of the "IR PROGRAM SIGNAL?" decision node 1506 is "no", the program proceeds to the "SPECIAL FUNCTION?" decision node 1592 where a determination is made as to whether an IR signal has been received which indicates that a special function actuator 51*f–i* has been actuated on an enhanced wireless remote 50.

If the output of the "SPECIAL FUNCTION" decision node 1592 is "no", the program proceeds to the "LEARN ADDRESS MODE?" decision node 1590 where a determination is made as to whether an IR signal has been received which indicates that the control unit 10 is to be labelled with a new address. If the output of the "LEARN ADDRESS NODE" decision node 1590 is "no", the program proceeds to "RETURN TO TOP OF MAIN" 1564. If the output of the decision node 1590 is "yes", the program proceeds to "SAVE NEW ADDRESS" 1580 where the new address assigned to the control unit 10 is stored in a memory. Then the program proceeds to "RETURN TO TOP OF MAIN" 1564. If the output of the "SPECIAL FUNCTION?" decision node 1592 is "yes" this indicates a special function actuator 51*f–i* has been actuated on an enhanced wireless remote 50. The program then determines which special function has been selected by proceeding to the "LONG FADE FUNCTION?" decision node 1594 where a determination is made as to whether an IR signal has been received which indicates that the "LONG FADE FUNCTION" has been selected. If the output of the "LONG FADE FUNCTION" decision node 1594 is "yes", the unit is commanded to "FADE TO OFF WITH DETERMINED FADE TIME" 1596 wherein the light intensity level of lamp 114 is slowly decreased to zero over a time period which is dependant on how long the special function actuator was actuated and then the program proceeds to "FLASH LEDS" 1560, wherein the indicator 14 is cycled on and off as described above in connection with the description of the FADE TO OFF WITH DETERMINED FADE TIME special function. The program then proceeds to "UPDATE LEDS" 1562 where the intensity of indicators 14 is updated to reflect the new condition of the control unit 10. If the output of the "LONG FADE?" decision node 1594 is "no", the program proceeds to the "PREVIOUS LIGHT LEVEL?" decision node 1586 where a determination is made as to whether an IR signal has been received which indicates that the PREVIOUS LIGHT LEVEL special function has been selected. If the output of the "PREVIOUS LIGHT LEVEL" decision node 1586 is "no", the program proceeds to "RETURN TO TOP OF MAIN" 1564. If the output of the "PREVIOUS LIGHT LEVEL" decision node 1586 is "yes", the program proceeds to "RETURN TO PREVIOUS LIGHT LEVEL" 1588 where the control unit 10 is commanded to adjust the light intensity of lamp 114 to be that which it was prior to last being adjusted either by the operation of a scene selection actuator or an increase, or decrease power level selection actuator and then the program proceeds to "UPDATE LEDS" 1562 where the intensity of indicators 14 is updated to reflect the new condition of the control unit 10.

If the output of the "IN IR PROGRAM MODE?" decision node 1552 is "yes", indicating that control unit 10 is in "IR PROGRAM MODE" the program proceeds to the "RAISE?" decision node 1554 where a determination is made as to whether an IR signal has been received which indicates that an increase power level actuator 23*a*, 33*a*, has been actuated or a power selector actuator 43, 53 is in its up position. If the output of the "RAISE" decision node 1554 is "yes", the program proceeds to "INCREASE LIGHT LEVEL BY ONE STEP" 1556, where the output power of the control unit 10 is increased and the program then proceeds to "STORE LIGHT LEVEL AS PRESET FOR SCENE" 1558, where the new intensity level is stored for the scene select actuator being programmed and the program proceeds to "FLASH LEDS" 1560, where the indicators 14 are cycled as described above to indicate the scene select actuator being programmed and the current intensity level. The program proceeds to "UPDATE LEDS" 1562, where the intensity of indicators 14 is updated to reflect the new condition of the control unit 10 and the program then proceeds to "RETURN TO TOP OF MAIN" 1564. If the output of the "RAISE?" decision node 1554 is "no", the program proceeds to the "LOWER?" decision node 1566 where a determination is made as to whether an IR signal has been received which indicates that a decrease power level actuator 23*b*, 33*b* has been actuated or a power selection actuator 43, 53 is in its down position.

If the output of the "LOWER" decision node 1566 is "yes", the program proceeds to "DECREASE LIGHT LEVEL BY ONE STEP" 1568, where the output power of the control unit 10 is decreased and the program then proceeds to "STORE LIGHT LEVEL AS PRESET FOR SCENE" 1558, "FLASH LED 1560", and then "UPDATE LEDS" 1562 and "RETURN TO TOP OF MAIN" 1564, with the same effects as described immediately above.

If the output of the "LOWER" decision node 1566 is "no", the program proceeds to the "SCENE COMMAND" decision node 1572, where a determination is made as to whether an IR signal has been received which indicates that a scene select actuator 31*a*, 41*a–d*, 51*a–d* has been actuated. If the output of the "SCENE COMMAND" decision node 1572 is "yes", the program proceeds to the "DETERMINE SCENE" node 1574 where a determination is made as to which scene select actuator has been actuated and then the program proceeds to the "HAS THE SAME SCENE ACTUATOR BEEN ACTUATED IN THE LAST 0.5 SEC?" decision node 1576 where a determination is made as to whether the same scene select actuator has been actuated in the last 0.5 seconds. If the output of the "HAS THE SAME SCENE ACTUATOR BEEN ACTUATED IN THE LAST 0.5 SEC" decision node 1576 is "yes", the program proceeds to "ADD FOUR TO THE SCENE NUMBER" 1570, and "FADE TO SCENE" 1578, where the light intensity level of lamp 114 is increased or decreased to the last light intensity level stored for the preset intensity level being programmed. The program then proceeds to "STORE LIGHT LEVEL AS PRESET FOR SCENE" 1558, "FLASH LEDS" 1560 and then "UPDATE LEDS" 1562 and "RETURN TO TOP OF MAIN" 1564 with the same effects as described above.

If the output of the "HAS THE SAME SCENE ACTUATOR BEEN ACTUATED IN THE LAST 0.5 SECOND?" decision node 1576 is "no", the control unit is commanded to "FADE TO SCENE" 1578 without adding four to the scene number, "STORE LIGHT LEVEL AS PRESET FOR SCENE" 1558, "FLASH LEDS" 1560, "UPDATE LEDS" 1562 and then "RETURN TO TOP OF MAIN" 1564 with the same effects as described above. If the output of the "SCENE COMMAND?" decision node 1572 is "no", the program proceeds to the "OFF?" decision node 1582 where a determination is made as to whether an IR signal has been received which indicates that an off actuator 31*b*, 41*e*, 51*e* has been actuated.

If the output of the "OFF" decision node 1582 is "yes", the unit is commanded to "FADE TO OFF" 1584, where the output power of control unit 10 is decreased to zero and the program then proceeds to "STORE LIGHT LEVEL AS PRESET FOR SCENE" 1558, "FLASH LEDS" 1562 "UPDATE LEDS" 1562 and then "RETURN TO TOP OF MAIN" 1564 with the same effects as described above. If the output of the "OFF?" decision node 1582 is "no", the program proceeds to "RETURN TO TOP OF MAIN" 1564.

In an alternate embodiment of the present invention the power control unit 10 includes an infrared lens 70 for receiving infrared signals from the wireless remote control units 20, 30, 40, 50.

Figure 7:
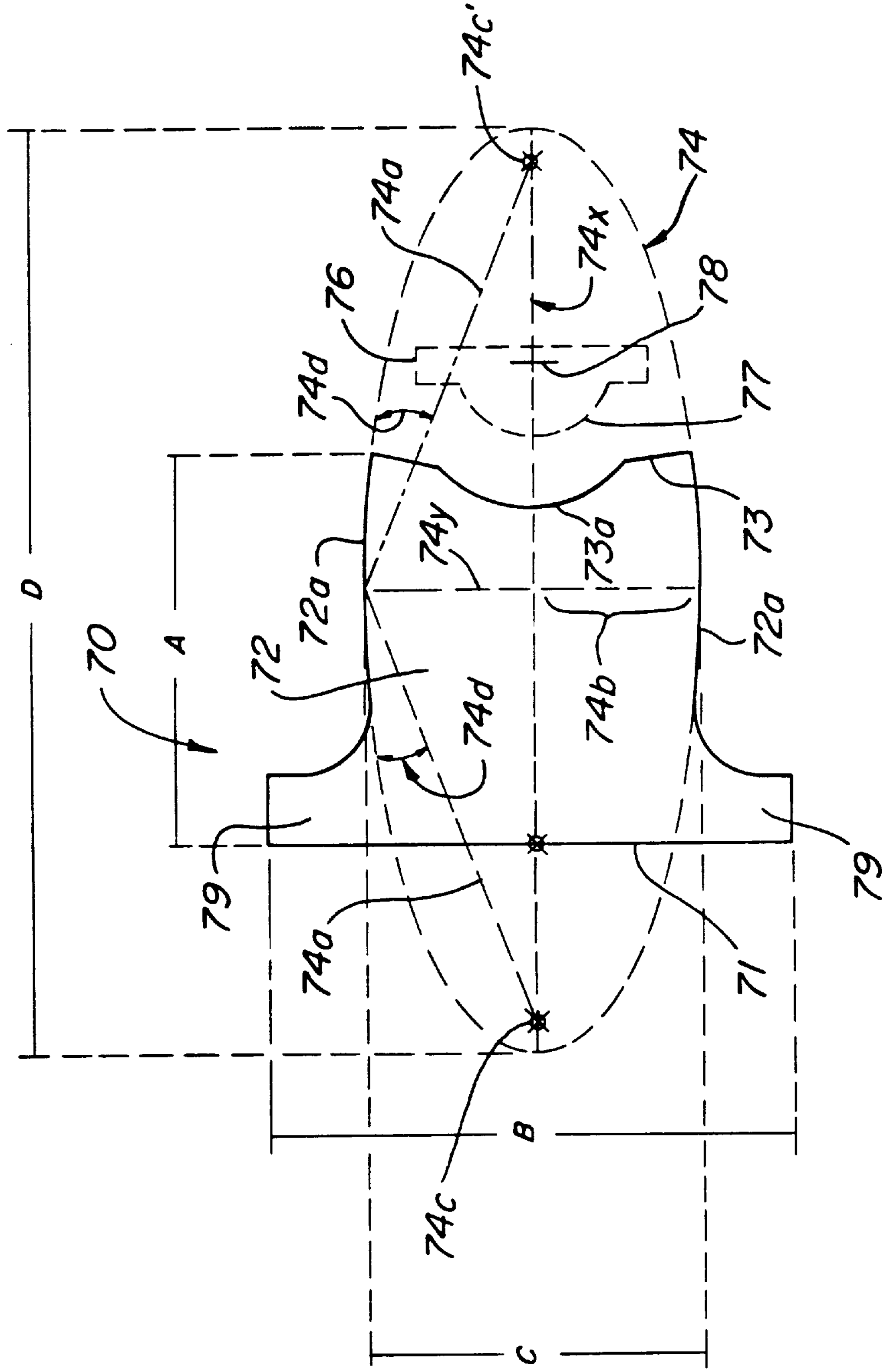
FIG. 7 shows top plan view of a preferred embodiment of a infrared lens in accordance with the present invention.
Figure 8A:
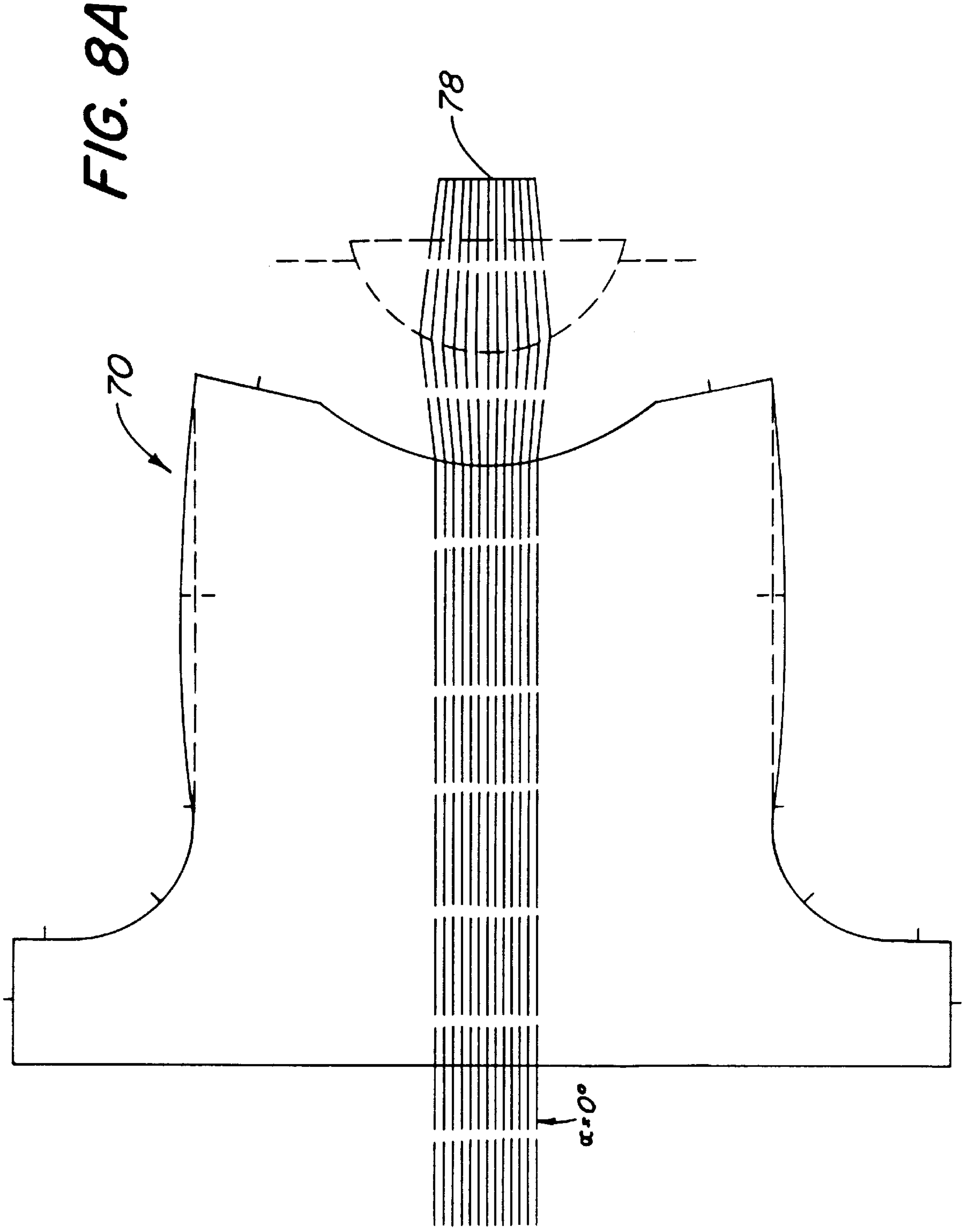
FIG. 8A illustrates the operation of the infrared lens shown in FIG. 7, when infrared light at an incident ray angle of 0° passes through lens.
Figure 8B:
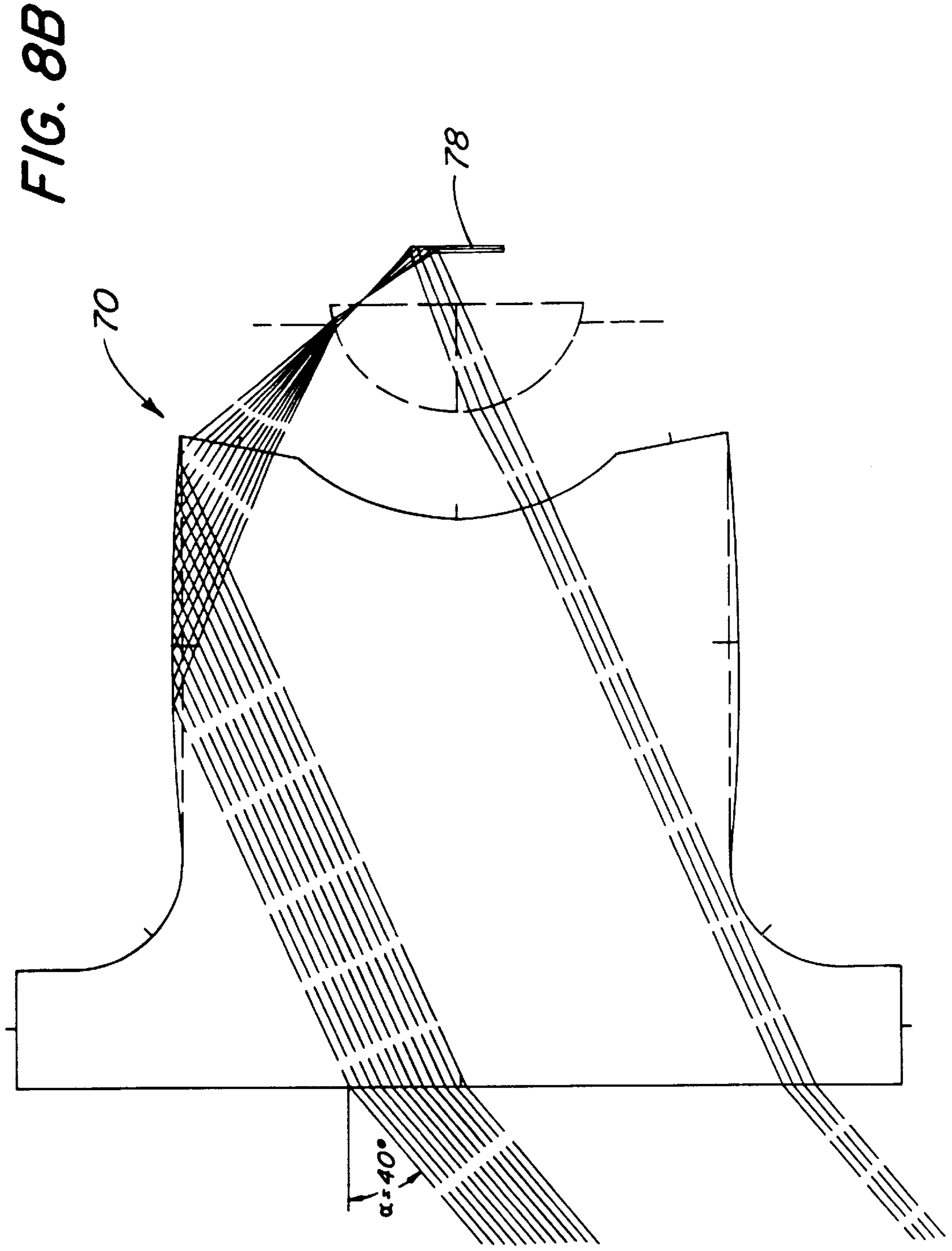
FIG. 8B illustrates the operation of the infrared lens shown in FIG. 7, when infrared light at an incident ray angle of 40° passes through lens.

Referring to FIG. 7, which shows a top plan view of lens 70 the basic principle of operation of the infrared lens 70 is to refract and reflect infrared light through the lens 70 and into a detector 76 which has an infrared receiving surface 78 contained within it which receives the infrared energy and converts it into electrical energy. The lens 70 includes an input surface 71, an output surface 73, and a flat body portion 72 therebetween. The input surface 71 is preferably planar and has a rectangular shape as viewed normal to the input surface 71. Included within the rectangular shape are input surface extension sections 79 which extend beyond the main body portion 72 at opposing ends of the input surface 71. The input surface extension sections 79 enhance the mid angle performance of the lens 70, thereby enabling the lens to capture more of the infrared light that is incident within angles around ±40° normal to the input surface 71 as shown in FIG. 8B.

The lens output surface 73 includes a concave portion 73*a* which is concave inwardly towards the center of the lens 70. The concave portion 73*a* refracts infrared light passing through it from body portion 72 onto an input surface 77 of a detector 76, and hence onto receiving surface 78.

Figure 8C:
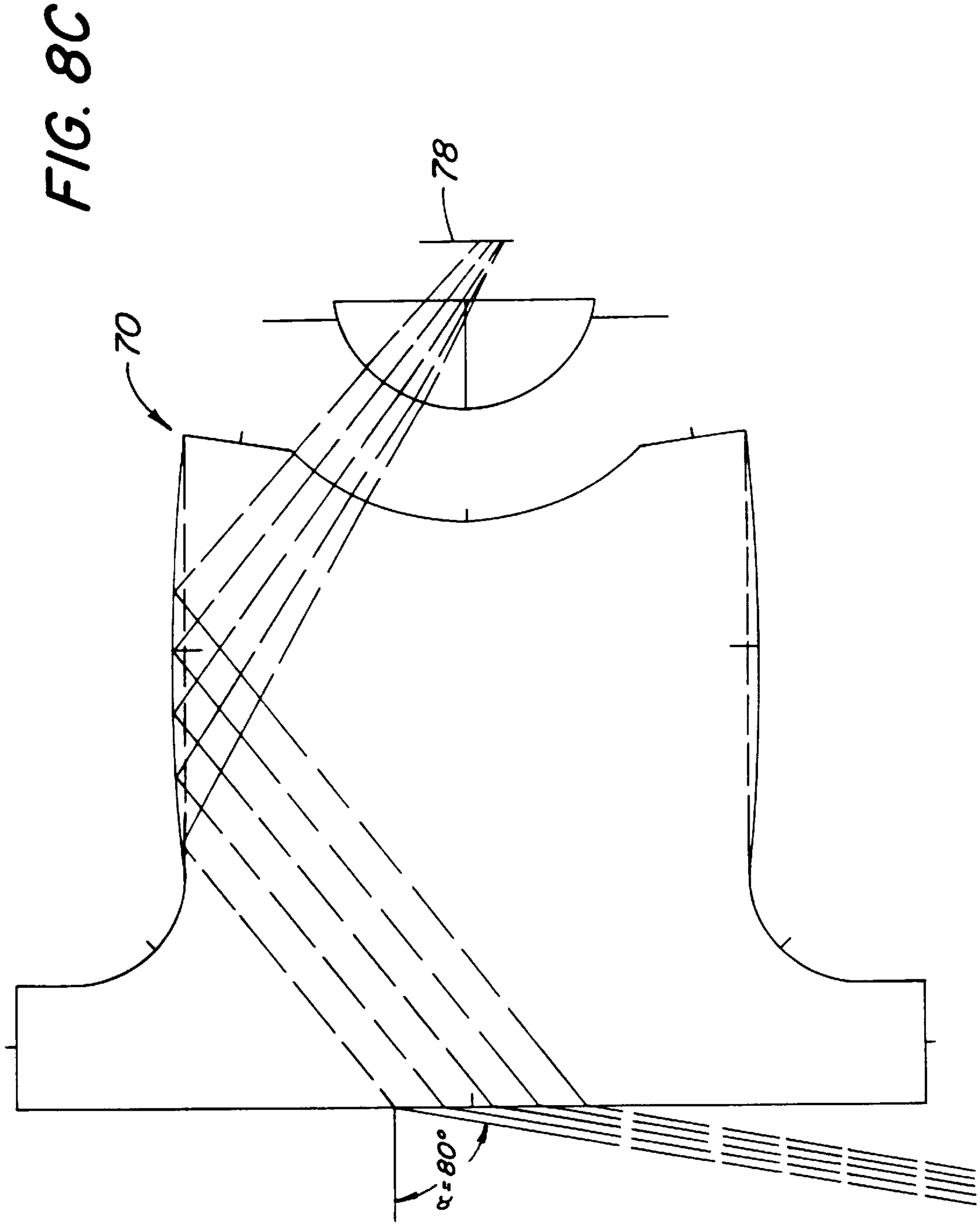
FIG. 8C illustrates the operation of the infrared lens shown in FIG. 7, when infrared light at an incident ray angle of 80° passes through lens.
Figure 9A:
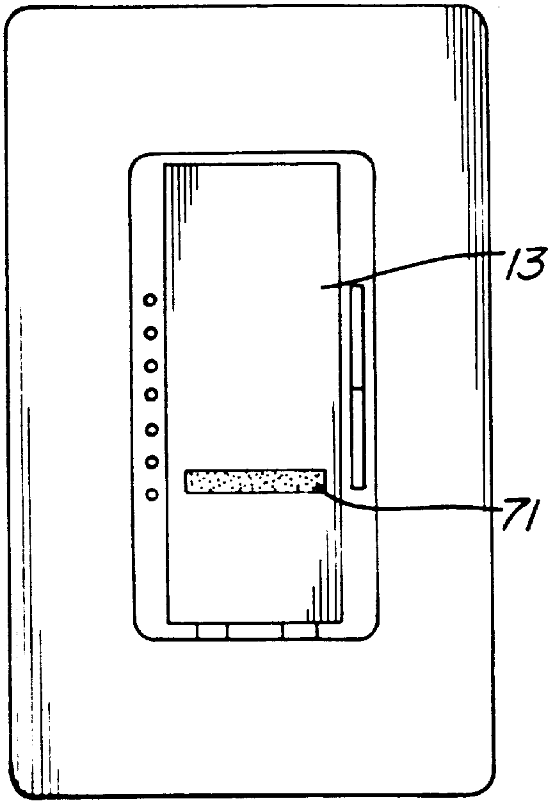
FIG. 9A illustrates the installation of the infrared lens located in a moveable surface, in accordance with the present invention.

The body portion 72 has a substantially flat shape with planar top and bottom surfaces, with side surfaces 72*a* defined by an ellipse 74. The ellipse 74 is defined, in Cartesian coordinates, according to the equation $$\frac{x^2}{a^2} + \frac{y^2}{b^2} = 1,$$

where the ellipse is symmetric with respect to a major axis 74*x*, and a minor axis 74*y* such that two arc lengths 74*a* are the distances from an arbitrary point on the ellipse 74 to the two focal points 74*c*, 74*c*'. The two arc lengths 74*a* from the focal points 74*c*, 74*c*' subtend equal angles 74*d* with the perimeter of the ellipse 74 for any arbitrary point on the ellipse thereby defining the side surfaces 72*a* of the lens 70. The side surfaces 72*a* reflect the infrared light entering the body portion 72 from the input surface 71, and direct the reflected light towards the output surface 73 as shown in FIGS. 8A, 8B, and 8C. These figures illustrate infrared light incident to the input surface 71 at 0°, 40°, and 80° respectively, and collectively show how lens 70 captures infrared radiation over a wide angle field of view in the horizontal plane when the lens is installed in actuator 13 as shown in FIG. 9A The operation of the lens 70 is described with reference to FIG. 7. When a point source of infrared light (not shown) located at focus 74*c* uni-directionally emits infrared light, then, for all subtended angles 74*d* (hereinafter α) with angles $\alpha \leqq \sin^{-}(1/n) = \alpha_0$ (Snell's Law: where n is the refractive index of the lens material) the light rays will undergo total internal reflection at the perimeter of the ellipse 74 that define the lens side surfaces 72*a*. The light is then reflected to the other focus 74*c*'. As the eccentricity of the ellipse is increased, the subtended angles 74*d* corresponding to $\alpha \leqq \alpha_0$ also increase. Therefore, as the minor axis 74*y* of the ellipse 74 is decreased, the field of view of the input surface 71 is increased.

In operation, infrared light originates from an external source such as a wireless remote transmitter 20, 30, 40, 50 for a power control unit 10 and enters the input surface 71. In a preferred embodiment of the lens, the input surface 71 has a planar rectangular shape. However, it is understood that the lens can be made in any shape and contour. Preferably, the input surface 71 is a rectangle where the longer dimension is 0.660" and the shorter dimension is 0.120" as seen from the front of the unit, as shown in FIG. 9A. In addition, the lens 70 is typically constructed from an optical material such as polycarbonate plastic having a refractive index n, which is preferrably between 1 and 2, where n is defined as the ratio between the speed of light in a vacuum to the speed of light in the optical material. Preferable Lexan 141 is used having a refractive index n=1.586.

Referring to FIG. 7, the infrared detector 76 (shown in dashed line) is a infrared receiving diode (photo diode) 78 enclosed in a hemispherical cover 77 typically comprising an infrared transmissive material. A suitable infrared detector is manufactured by Sony and sold under the part number SBX8025-H.

Figure 9B:
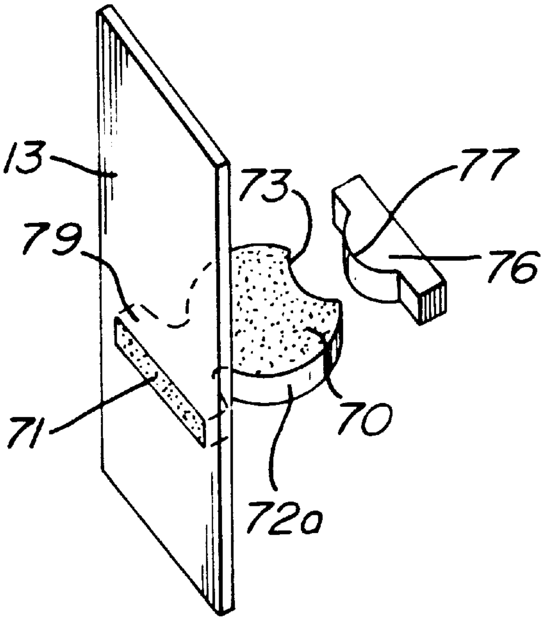
FIG. 9B is an isometric illustration of the infrared lens located in a moveable surface and an infrared detector.

In another aspect of the invention the lens 70 is placed on a movable member such as a control switch actuator 13, and is located as that so that the lens' output surface 73 is adjacent to the input surface 77 of the infrared detector 76. The infrared detector 76 is located in a fixed position behind the lens 70. The movable member 13 shown in FIGS. 9A and 9B and the lens 70 move in a direction toward and away from the fixed position of the infrared detector 76 and its input surface 77. Typically, the output surface 73 of the lens 70 is separated from the front surface 77 of detector 76 by 0.080", at the point where it is furthest away from the from surface 77.

The concave output surface 73 of the lens 70 provides desired optical properties and also conforms generally to the input surface 77 of the detector 76. This enables lens 70 to be mounted closer to detector 76.

The above description discloses how to construct two dimensions of a lens 70 with a wide angle of view in a single plane preferably the horizontal plane as lens 70 is installed in control switch actuator 13 and further the operation of lens 70 has been described in two dimensions along x and y axes.

To construct a lens with a wide angle view in two directions, the above design is used twice in orthogonal directions about the axis 74*x* of the lens. The resulting lens is an ellipsoid. The lengths of the y axis, 74*y*, and the z axis (not shown) perpendicular to the light rays entering the lens at zero degrees to the normal are dependent on the shape of the receiving surface 78 in the infrared detector 76. In the case of a square receiving surface 78 the y axis and the z axis of the lens are equal, and subsequently the input surface of the 76 lens is circular. Such a lens has equal wide angle performance in all directions in front of the lens. When wide angle performance is desired only along a single plane, the lens nevertheless has to have some thickness. One way to produce such a lens is to slice the ellipsoid top and bottom such that the thickness is preferably approximately equal to the thickness of the receiving surface 78. The result is an input surface 71 that is substantially a rectangle, with the short edges conforming to arcs of an ellipse. This is substantially the structure illustrated in FIGS. 7, 9B where the side surfaces 72*a* are portions of ellipses in two directions.

The present invention may be embodied in other specific forms without departing from the spirit or essential attributes thereof and, accordingly, reference should be made to the appended claims, rather than to the foregoing specification, as indicating the scope of the invention.

What is claimed is:

1. A lens for receiving infrared light, comprising:

a planar infrared light receiving surface, an infrared light output surface, and a flat infrared light transmissive body portion connected therebetween, said output surface having a shape substantially conforming to an input surface of an infrared detector, said flat body portion having external side surfaces substantially conforming to an ellipse, said side surfaces being laterally spaced from a longitudinal axis of said body portion and shaped to reflect infrared light entering said lens input surface and said body portion to said output surface, said output surface directing the infrared light onto said input surface of said infrared detector, said body portion having a thickness which is less than the distance between said input and said output surfaces and further less than the distance between said external side surfaces.

2. A lens according to claim 1, wherein said lens is located on a movable member such that said lens output surface is adjacent to and moves toward and away from the input surface of said infrared detector.

* * * * *